(12) United States Patent
Shiomoto et al.

(10) Patent No.: US 7,263,289 B2
(45) Date of Patent: Aug. 28, 2007

(54) OPTICAL DYNAMIC BURST SWITCH

(75) Inventors: Kohei Shiomoto, Iruma (JP); Naoaki Yamanaka, Tokyo (JP); Eiji Oki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 725 days.

(21) Appl. No.: 10/284,744

(22) Filed: Oct. 31, 2002

(65) Prior Publication Data

US 2004/0213568 A1  Oct. 28, 2004

(30) Foreign Application Priority Data

Nov. 2, 2001 (JP) ............................ P2001-337898
Nov. 2, 2001 (JP) ............................ P2001-337920
Nov. 2, 2001 (JP) ............................ P2001-338058
Nov. 2, 2001 (JP) ............................ P2001-338067

(51) Int. Cl.
*H04J 14/00* (2006.01)

(52) U.S. Cl. ...................... 398/57; 398/49; 398/50; 398/51; 398/56

(58) Field of Classification Search ................ 398/45, 398/50, 51, 56, 54, 49, 55, 57
See application file for complete search history.

(56) References Cited

U.S. PATENT DOCUMENTS

| 6,519,062 B1 * | 2/2003 | Yoo ............................ 398/49 |
| 6,522,435 B1 * | 2/2003 | Chang et al. .................. 398/49 |
| 6,665,495 B1 * | 12/2003 | Miles et al. ................... 398/54 |
| 6,671,256 B1 * | 12/2003 | Xiong et al. ................. 370/230 |
| 6,678,474 B1 * | 1/2004 | Masuda et al. ................ 398/75 |
| 6,763,192 B1 * | 7/2004 | Jagannathan .................. 398/54 |
| 6,772,219 B1 * | 8/2004 | Shobatake .................... 709/238 |
| 6,898,205 B1 * | 5/2005 | Chaskar et al. ............. 370/450 |
| 6,907,002 B2 * | 6/2005 | Beshai et al. ................ 370/230 |
| 6,956,868 B2 * | 10/2005 | Qiao ........................... 370/466 |
| 6,963,564 B1 * | 11/2005 | Liu .............................. 370/389 |
| 2001/0017866 A1 * | 8/2001 | Takada et al. ............... 370/535 |
| 2002/0109878 A1 * | 8/2002 | Qiao ........................... 359/118 |
| 2002/0109879 A1 * | 8/2002 | Wing So ..................... 359/118 |
| 2002/0186433 A1 * | 12/2002 | Mishra ........................ 359/128 |

FOREIGN PATENT DOCUMENTS

| EP | 0 883 266 A2 | 12/1998 |
| EP | 1 073 307 A2 | 1/2001 |
| JP | 2000-324162 | 11/2000 |
| WO | 01/84875 | 11/2001 |

OTHER PUBLICATIONS

K. Shiomoto et al., U.S. Patent Application filed Oct. 31, 2002, entitled "Optical Dynamic Burst Switch".
K. Shiomoto et al., U.S. Patent Application filed Oct. 31, 2002, entitled "Optical Dynamic Burst Switch".
Daisaki Shimazaki et al., "A moving virtual source scheme in optical burst switching networks", NTT Network Innovation Laboratories, NTT Corporation, pp. 31-36.

* cited by examiner

*Primary Examiner*—M. R. Sedighian
(74) *Attorney, Agent, or Firm*—Darby & Darby

(57) ABSTRACT

The present invention relates to a node used in an optical communication network, and comprises functions for transferring and receiving data, and a unit for establishing and releasing a cut through path to a node of the next stage, the establishing and releasing unit having a detecting unit which detects the arrival of a request packet for establishing a cut through path to the node stage.

15 Claims, 24 Drawing Sheets

FIG. 5

| R | PREAMBLE | BURST DATA | #1 | PREAMBLE | BURST DATA | #3 | PREAMBLE | BURST DATA |

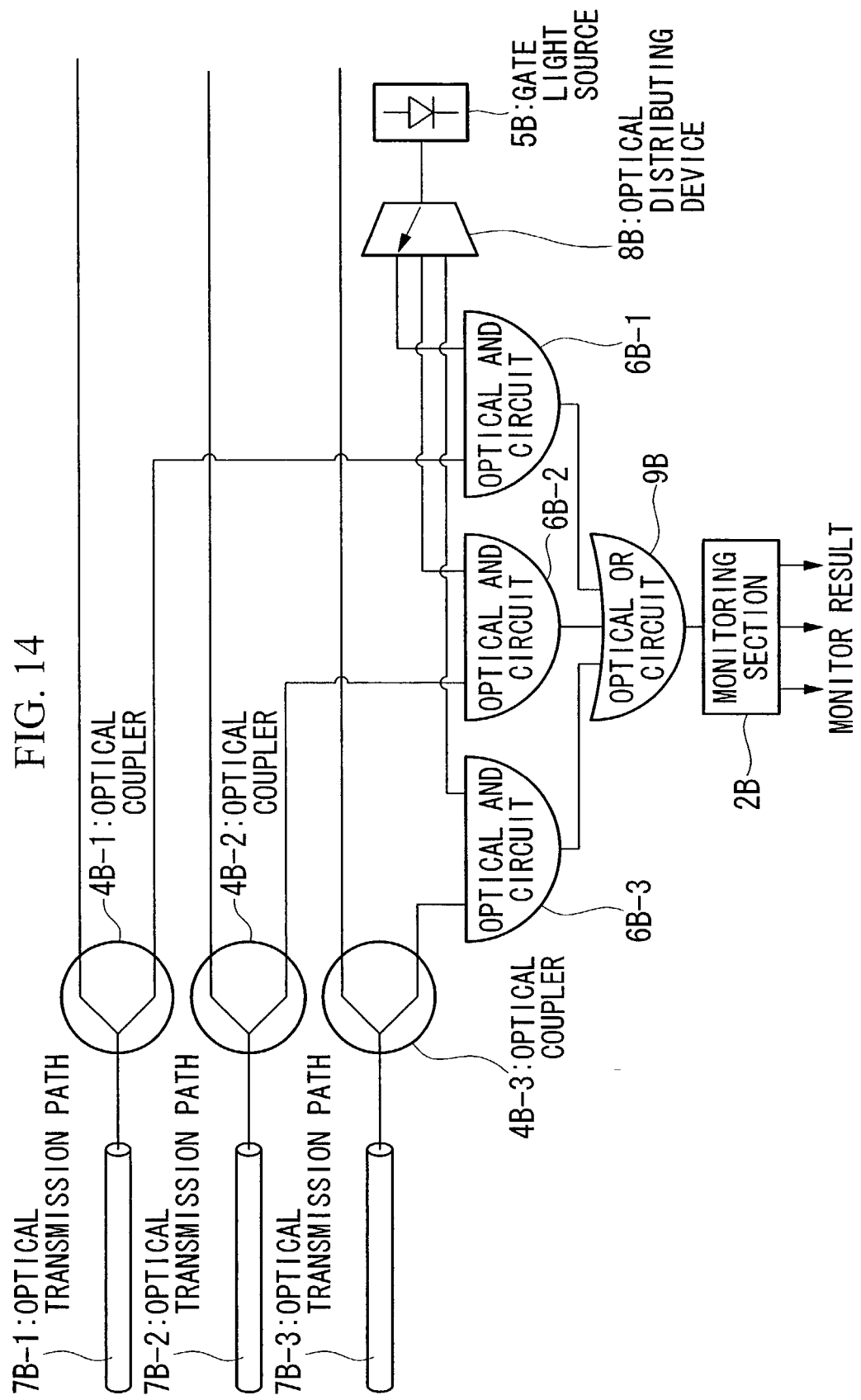

OPTICAL DYNAMIC BURST SWITCH

BACKGROUND OF THE INVENTION

1. Field of the Invention

The present invention is used in optical communications, and relates to techniques for transferring optical burst data in a communication network used in transferring burst data using optical wavelengths as communication media.

This application is based on patent applications Nos. 2001-337898, 2001-337920, 2001-338058, and 2001-338067 filed in Japan, the content of which is incorporated herein by reference.

2. Description of the Related Art

In conventional transferring of IP (internet protocol) data in optical communications, a plurality of routers are provided between the start point and the end point, and the data is transferred via these routers. The routers determine the next routers which the data is to be transferred to by referring to IP addresses, appended to the packets.

In an optical communication network of this type, when reading the header information of the packet, the optical signal is temporarily converted to an electrical signal. The router determines the next router which the data is to be transferred to in compliance with the IP address, read in this manner.

When transferring data in bursts, it is inefficient to read each of the IP addresses of the packets one by one; therefore, a cut through path between the start point and end point is set in advance, and, since the IP headers need not be read in segments of this cut through path, the optical signal can be transferred at high speed.

In this type of conventional optical communication, when transferring burst data by using the cut through path, the cut through path must be established in advance. To establish the cut through path in advance, a request to establish the cut through path is sent to each of the routers from the start point to the end point, the preliminary establishment of the cut through path being completed when the routers have complied with this request.

The procedure for establishing the cut through path at the routers comprises (1) converting the header information of the optical IP packet which has arrived to an electrical signal, and (2) determining whether information corresponding to a request to establish the cut through path is contained in the header information. When the information contains an establishment request, a wavelength is selected for establishing the cut through path, and the cut through path is established when a wavelength has been selected. Then, since there is no longer any need to read the header information of the IP packet on the wavelength which the cut through path has been established at, the establishment is altered in order to differentiate this wavelength from other wavelengths, where the IP packet is transferred in the form of an optical signal.

However, this type of establishment procedure requires a considerable amount of time. For example, let us assume that 2 t seconds are needed to establish the cut through path. When it takes 3 t seconds to transfer burst data using this cut through path, a total of 5 t seconds is required to establish the cut through path and transfer the burst data. In this example, nearly half of the total time of 5 t seconds to transfer the burst data is taken up by establishing the cut through path. If the time taken to establish the cut through path beforehand could be used for transferring data, the transferring efficiency would be greatly increased.

Although a cut through path is most appropriate for transferring burst data using a wavelength path, the quality of the optical signal deteriorates during transmission due to various factors. Consequently, there are inevitable limitations on the length of a cut through path which signals can be transmitted along without 3R processing.

Conventionally, the places to be 3R processed are determined by calculation. This calculation has two problems. The first is that deterioration in signal quality has a variety of causes, so that a huge amount of data must be processed in order to consider the great number of causes in the calculation. This increases the time needed to complete the calculation. The second problem is that the result obtained by such a calculation may not be highly accurate, necessitating safety measures such as providing extra places for 3R processing; this is not an efficient use of network resources.

SUMMARY OF THE INVENTION

The present invention has been realized based on the background described above, and aims to provide a node and optical communication network which facilitate the design of nodes, shorten the time taken to establish a cut through path without needing to establish the cut through path in advance, efficiently transfer burst data, and, in addition, enable wavelength resources to be used effectively.

It is a further object of this invention to provide a node, an optical communication network (optical path network), and a program, which can reduce the processes and time needed to set positions for 3R processing, identify accurate positions, and use network resources effectively.

A feature of this invention is its dedicated provision of a wavelength for control, which is used in establishing the cut through path. By determining a dedicated wavelength for establishing the cut through path in this way, the processing procedures of the CPU which handles the wavelength need only comprise procedures for establishing the cut through path, enabling the processing speed to be increased.

For example, when a packet has arrived on the dedicated wavelength for establishing the cut through path, it is not necessary to determine whether the packet is a normal information packet or a control packet for establishing the cut through path, and the procedures for establishing the cut through path can start more quickly, thereby shortening the processing time.

Furthermore, a dedicated wavelength can be provided to be used as the cut through path. Since this puts an end to the use of a single optical wavelength sometimes as a wavelength for transferring general data, and sometimes as a wavelength for the cut through path, there is no need to read the header information of IP packets transferred on the dedicated wavelength used as the cut through path. Therefore, a mechanism for reading the header can be entirely omitted from the design. This enables the node to be designed more simply. Moreover, since there is no need to select a wavelength after the arrival of a request to establish the cut through path, or to alter settings to distinguish the wavelength for data transferring from another wavelength for data transferring which is not a cut through path, the time taken to establish the cut through path can be shortened.

According to another constitution of this invention, in order that the node may efficiently obtain requests for establishing, releasing, and path switching of the cut through path, a promise is made to insert a preamble and control information following the preamble in advance into the data, and the node extracts the control information by monitoring the preamble, enabling the request to establishing, releasing, and switching the cut through path to be obtained.

When the control information following the preamble is known in advance in this manner, the process of identifying whether or not a request to establish, release, and switch the cut through path is contained in data which will arrive, executed by the CPU, can be shortened. Furthermore, after the cut through path has been established, a request to release or switch the cut through path can be obtained merely by monitoring the cut through path; therefore, there is no need to monitor a plurality of wavelengths, thereby simplifying the monitoring procedure. Consequently, less time and effort is needed to establish, release, and switch the cut through path than in conventional networks. In addition, since the wavelength for controlling the cut through path is the same as the wavelength for establishing the cut through path, wavelength resources are used more effectively.

That is, the present invention comprises a data transferring function for transferring data, a data receiving function for receiving data, and a unit for establishing and releasing a cut through path to a node of the next stage, wherein a plurality of different wavelengths for transferring data being set between the node of the preceding stage and the node of the next stage.

This invention is characterized in that a preamble and control information, following the preamble, for requesting establishing, releasing, and path switching of the cut through path, are inserted at the wavelength for transferring data, and the unit for establishing and releasing the cut through path comprises a first monitoring unit which monitors the preamble and the control information following the preamble at each of the plurality of wavelengths for transferring data, an establishing unit which, in accordance with the monitor result of the first monitoring unit, establishes the cut through path in accordance with a request when the control information following the preamble contains a request to establish the cut through path, a second monitoring unit which, after the establishing unit has established the cut through path, monitors the preamble and the control information following the preamble in each burst data transferred along the cut through path, an executing unit which, in accordance with the monitor result of the second monitoring unit, executes path switching of the cut through path in accordance with a request when the control information following the preamble contains a request to switch the cut through path, and a releasing unit which, in accordance with the monitor result of the second monitoring unit, releases the cut through path in accordance with a request when the control information following the preamble contains a request to release the cut through path.

Since the preamble makes it possible to identify the segments of the burst data, and the control information inserted after the preamble specifies how the burst data should be handled, a plurality of burst data in different directions can be serially transferred on a single cut through path. This enables the burst data to be transferred efficiently, while making effective use of wavelength resources.

According to another constitution of this invention, in order that the node may efficiently obtain requests for establishing, releasing, and continuing the cut through path, a promise is made to insert these requests into the data in advance at cycles t, and the node obtains the requests for establishing, releasing, and continuing the cut through path by extracting the information written in the data at cycles t.

This invention is characterized in that, when transferring data, a timing, which the information requesting an establishment of a cut through path can be inserted at, is established in each cycle t, and a unit for establishing and releasing the cut through path comprises a first monitoring unit which monitors the transferred data for a predetermined period of time in each cycle t at each of the plurality of wavelengths for transferring data, an establishing unit which, when information requesting a cut through path establishment is extracted by the first monitoring unit, establishes the cut through path in accordance with the request, a second monitoring unit which, when information requesting continuation or release of the cut through path is inserted in each cycle t of burst data transmitted along the cut through path, which was established by the establishing unit, monitors the burst data transferred along the cut through path for a predetermined period of time in each cycle t, a continuation unit which, when information requesting continuation of the cut through path has been extracted by the second monitoring unit, continues the establishment of the cut through path in accordance with the request, and a release unit which, when information requesting release of the cut through path establishment has been extracted by the second monitoring unit, releases the establishment of the cut through path in accordance with the request.

Consequently, the signal for controlling the establishment of the cut through path need not be handled separately from the signal for transferring data, enabling the cut through path to be established, released, and continued within the flow of a single signal. This makes it possible to omit the time-consuming conventional process of searching for an empty wavelength after a request to establish the cut through path has arrived, and establishing the cut through path at that wavelength. Further, since the wavelength for controlling the cut through path may be the same as the wavelength for establishing the cut through path, wavelength resources can be used effectively.

One each of the first and second monitoring units may be provided for each wavelength for transferring data and each cut through path which has been established. Alternatively, the timings are set at mutually different phases at the plurality of wavelengths for transferring data, the first monitoring unit includes a unit which is provided communally for the plurality of wavelengths for transferring data, and sequentially monitors the information requesting the settings at the timings in a time-sharing arrangement, the information requesting continuation and release of the cut through path is inserted at mutually different phases in the burst data transmitted along the plurality of cut through paths, and the second monitoring unit includes a unit which is provided communally for the plurality of cut through paths, and sequentially monitors the information requesting the continuation and release at the timings in a time-sharing arrangement.

In the latter constitution, one monitoring unit may be provided for a plurality of wavelengths, enabling the hardware constitution to be simplified.

According to another constitution of this invention, instead of establishing the cut through path in advance of transferring the burst data, each node establishes a sequential cut through path when a request packet for establishing cut through path has arrived. As a consequence, the time taken to establish the cut through path is shorter than when establishing it in advance, enabling the burst data to be transferred more efficiently.

A cut through path can be established by using a request packet for establishing cut through path while burst data are being transferred without using a cut through path. For example, it is possible to rapidly establish a cut through path when a great amount of new burst data must be transferred while burst data are being transferred without using a cut through path. Moreover, when a cut through path which has already been established is no longer needed, it can be released while the burst data are being transferred by using a cut through path release request, thereby enabling wavelength resources to be used effectively.

This invention is characterized in that it comprises a detecting unit which detects the arrival of a request packet for establishing cut through path at the node of the next stage, and the unit for establishing and releasing the cut through path comprises an establishing unit which, when the arrival of a request packet for establishing cut through path at the node of the next stage has been detected, establishes a cut through path from the transmission side edge node, or the relay node, to the node of the next stage.

Therefore, a request to establish a cut through path can be made at a given timing during data transferring. When the cut through path is no longer needed, for example, an optical path is provided for transmitting a request to release a cut through path established by the establishing unit, and the unit which establishes and releases the cut through path comprises a releasing unit for releasing the cut through path when the request to release the cut through path has arrived via the optical path, thereby enabling the cut through path to be released at a given timing during data transferring.

Alternatively, an insertion timing for control information is provided in the cut through path established by the establishing unit, and the unit which establishes and releases the cut through path comprises a monitoring unit which monitors the insertion timing, a follow-on continuation unit which continues the establishment of the cut through path when the monitoring unit has detected that the control information contains a request to continue the cut through path, and a releasing unit which releases the cut through path when the monitoring unit has detected that the control information contains a request to release the cut through path, thereby enabling the cut through path to be released at a given timing during data transferring.

Alternatively, a preamble and control information following the preamble are inserted into the cut through path established by the establishing unit, and the unit for establishing and releasing the cut through path comprises a monitoring unit which monitors the preamble, a detecting unit which detects the control information following the preamble when the preamble has been detected in accordance with the monitor result of the monitoring unit, a releasing unit which releases the cut through path when the detected control information contains a request to release the cut through path in accordance with the detection result of the detecting unit, thereby enabling the cut through path to be released at a given timing during data transferring.

Alternatively, the control information following the preamble may be omitted if the insertion of a preamble into the burst data is interpreted as a request to release the cut through path. In this case, the preamble is inserted into the cut through path established by the establishing unit, and the unit for establishing and releasing the cut through path comprises a monitoring unit which monitors the preamble, and a releasing unit which releases the cut through path when the preamble has been detected in accordance with the monitor result of the monitoring unit, enabling the cut through path to be released at a given timing during data transferring. This enables wavelength resources to be effectively used.

Furthermore, the unit for establishing and releasing the cut through path comprises a detecting unit which detects whether there has been a communication using the cut through path, established by the establishing unit, and a releasing unit which releases the cut through path when no communication has been detected by the detecting unit for a predetermined period of time. This makes it possible to detect a cut through path on which data transferring has ended, and release this cut through path, without a request to release the cut through path.

The node of this invention comprises a transmitting unit which, prior to the establishment of an optical path, transmits an optical packet for test along the path where the optical path is to be established, a determining unit which receives the optical packet for test and determines its signal quality, a notifying unit which, when the determining unit has determined that the signal quality has deteriorated, notifies the node of the preceding stage of that fact, and a 3R processing unit which receives the notification and executes 3R processing of subsequent optical packets which travel along the path.

According to this invention, on a wavelength path which data is transmitted along in the form of an optical signal, such as a cut through path, there is no need to calculate which position 3R processing must be carried out at, enabling the time and procedures required in establishing the cut through path to be reduced. Furthermore, since the position for 3R processing is determined by using the optical packet for test, these positions are precise, making it unnecessary to provide an extra 3R position, and thereby using the network resources effectively.

As described above, according to this invention, the design of the node can be simplified, and the establishing time of the cut through path can be shortened, and burst data can be transferred efficiently, without establishing a cut through path in advance. In addition, wavelength resources can be used effectively.

Furthermore, according to this invention, the time and procedures required to set a 3R processing position can be reduced, and the position can be precisely identified, thereby using the network resources effectively.

BRIEF DESCRIPTION OF THE DRAWINGS

FIG. 5 is a diagram showing a preamble and control information, inserted into burst data;

FIG. 14 is a diagram showing the monitoring constitutions of information B, C, and E, according to the fifth embodiment of this invention;

DETAILED DESCRIPTION OF PREFERRED EMBODIMENTS

Embodiments of the present invention will be explained with reference to the drawings.

In this application, "node on the transmission side" (transmission side edge node) and "node on the reception side" (reception side edge node) refer respectively to a node on the side which transmits a request to establish a path prior to transferring the data, and a node which becomes the final destination of the request. When transferring data after establishing the path, either of the node on the transmission side and the node on the reception side can become the data transmission source and data receive destination. Furthermore, the path which has been established may be unidirectional or bi-directional.

The node of this invention can be used as any one of a transmission side node, a reception side node, and a relay node, the functions of the following embodiments being appended to the node in accordance with its use.

Embodiment 1

Figure 1:
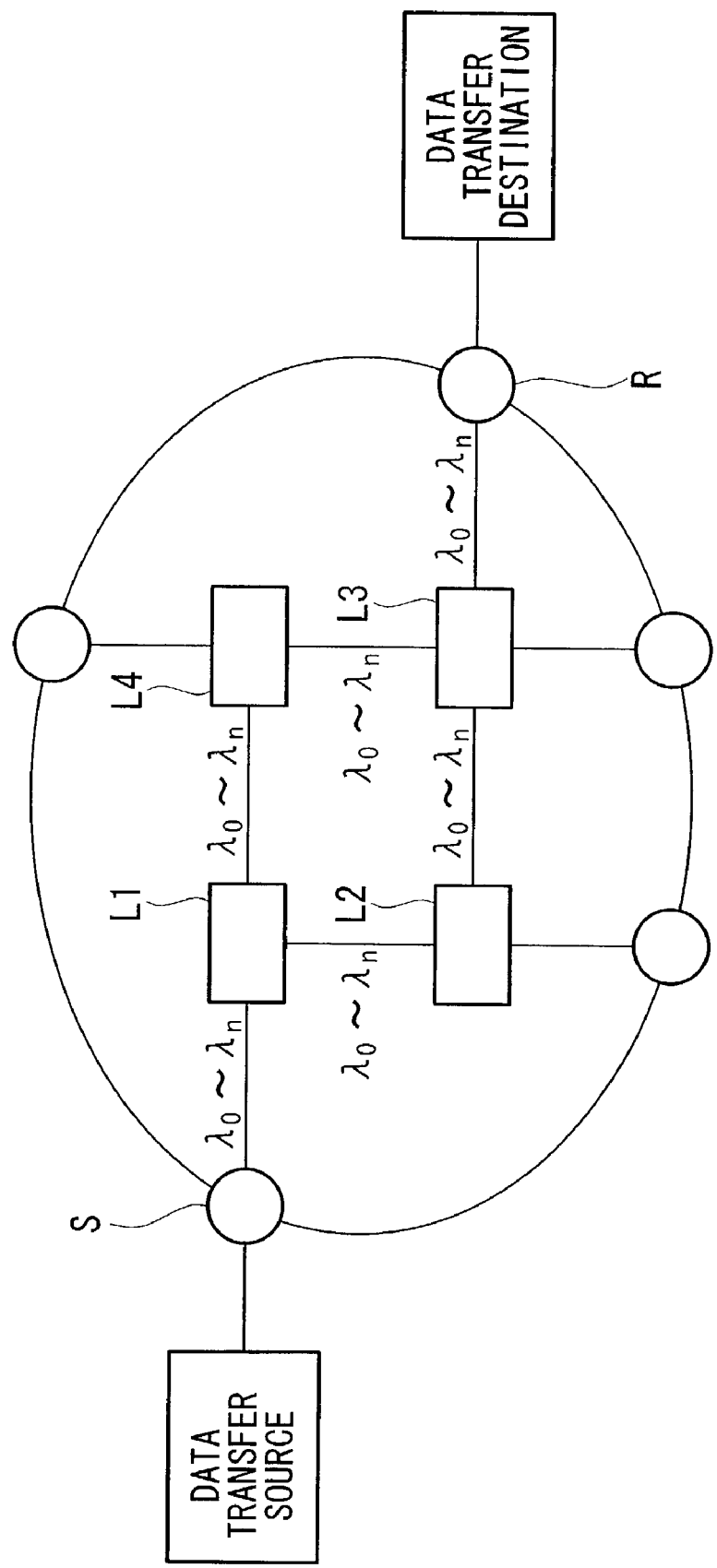
FIG. 1 is a conceptual diagram showing an optical communication network used a node according to embodiments one to ten of this invention.

An optical communication network of the first embodiment will be explained with reference to FIGS. 1 and 2. FIG. 1 is a conceptual diagram showing an optical communication network according to an embodiment of this invention, and FIG. 2, a diagram illustrating characteristics of the optical communication network according to the first embodiment of this invention.

In this embodiment, the transmission side edge node S and the reception side edge node R are distinguished from each other in order to simplify the explanation, but in reality, the functions of the transmission side and reception side are appended to both edge nodes, and communications can be transmitted in both directions.

As shown in FIG. 1, this invention comprises a transmission side edge node S which accommodates a data transferring source, a reception side edge node R which accommodates a data transferring destination, and relay nodes L1 to L4, provided between the transmission side edge node S and the reception side edge node R. This optical communication network has the functions of establishing and releasing a cut through path through the relay nodes L1 to L4 between the transmission side edge node S and the reception side edge node R, and a plurality of different wavelengths for transferring data $\lambda_0$ to $\lambda_n$ are set between the transmission side edge node S, the relay nodes L1 to L4, and the reception side edge node R. The function of establishing and releasing the cut through path may be given to each of the transmission side edge node S, the relay nodes L1 to L4, and the reception side edge node R; alternatively, the function may be appended to a single device, or dispersed across a plurality of devices for managing the establishment and release of the cut through path in an optical communication network outside the nodes. The function is realized by using conventional technology, omitted from the diagrams and the present explanation.

Figure 2:
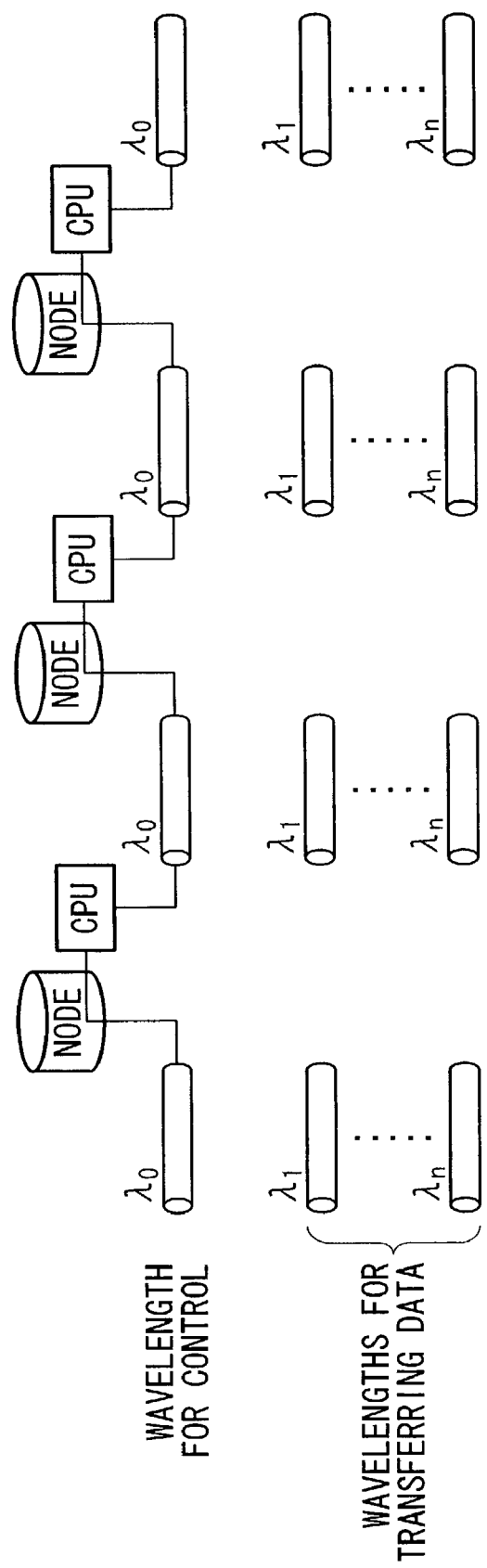
FIG. 2 is a diagram illustrating characteristics of an optical communication network according to a node of the first embodiment.

As shown in FIG. 2, it is a feature of this invention that the wavelength $\lambda_0$ of the wavelengths for transferring data $\lambda_0$ to $\lambda_n$ is set in advance as a wavelength for control, used in establishing and releasing the cut through path.

By determining a dedicated wavelength for control for establishing the cut through path, the processing procedures of the CPU which handles the wavelength need only comprise procedures for establishing the cut through path, enabling the processing speed to be increased.

That is, when a packet has arrived on the wavelength for control $\lambda_0$, it is not necessary to determine whether the packet is a normal information packet or a control packet for establishing the cut through path, and the procedures for establishing the cut through path can start more quickly, thereby shortening the processing time. The wavelength for establishing the cut through path is selected from any of the wavelengths for transferring data $\lambda_1$ to $\lambda_4$ which are presently available.

Embodiment 2

Figure 3:
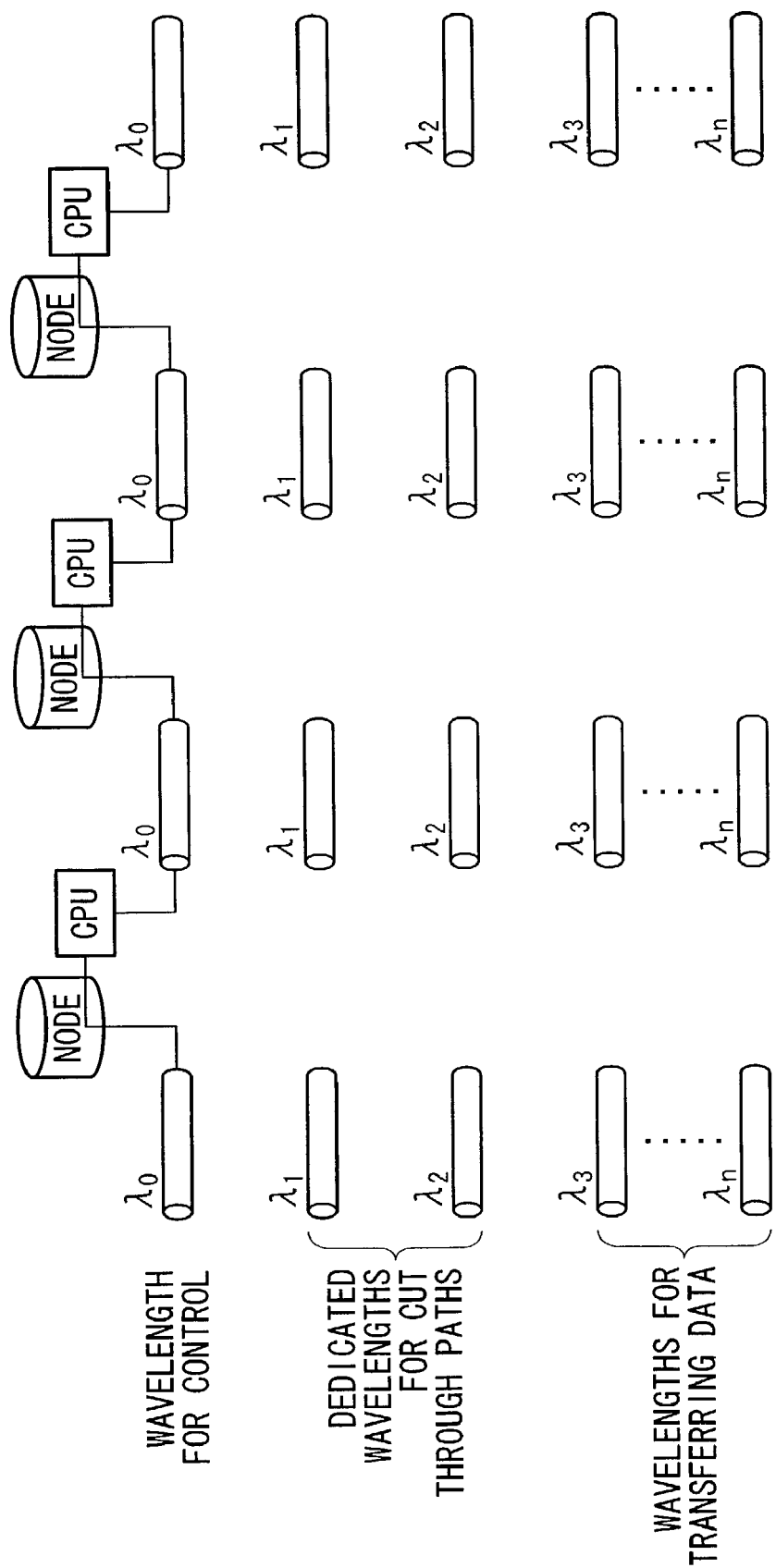
FIG. 3 is a diagram illustrating characteristics of an optical communication network according to a node of the second embodiment.

A second embodiment of this invention will be described with reference to FIG. 3. FIG. 3 is a diagram illustrating characteristics of an optical communication network according to the second embodiment of this invention. In the second embodiment, in addition to the wavelength for control $\lambda_0$, $\lambda_1$ and $\lambda_2$ of the wavelengths for transferring data $\lambda_1$ to $\lambda_n$ are set in advance as dedicated wavelengths to be used as cut through paths.

Since this puts an end to the use of a single optical wavelength sometimes as a wavelength for transferring general data, and sometimes as a wavelength for the cut through path, there is no need to read the header information of IP packets transferred on the dedicated wavelength used as the cut through path. Therefore, a mechanism for reading the header can be entirely omitted from the design. This enables the node to be designed more simply. Moreover, since there is no need to select a wavelength after the arrival of a request to establish the cut through path, or to alter settings to distinguish the wavelength for data transferring from another wavelength for data transferring which is not a cut through path, the time taken to establish the cut through path can be shortened.

Embodiment 3

Figure 4:
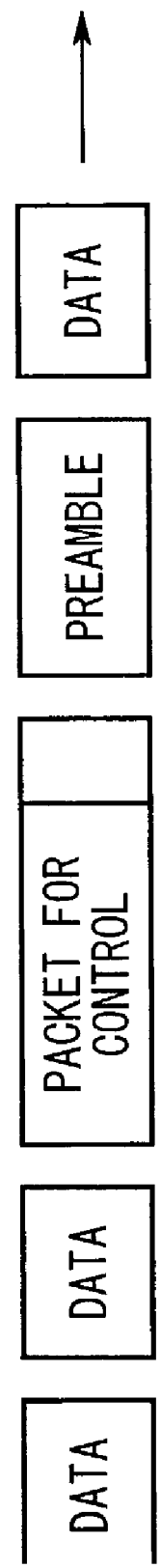
FIG. 4 is a diagram showing a preamble and a control packet, inserted into data.
Figure 6:
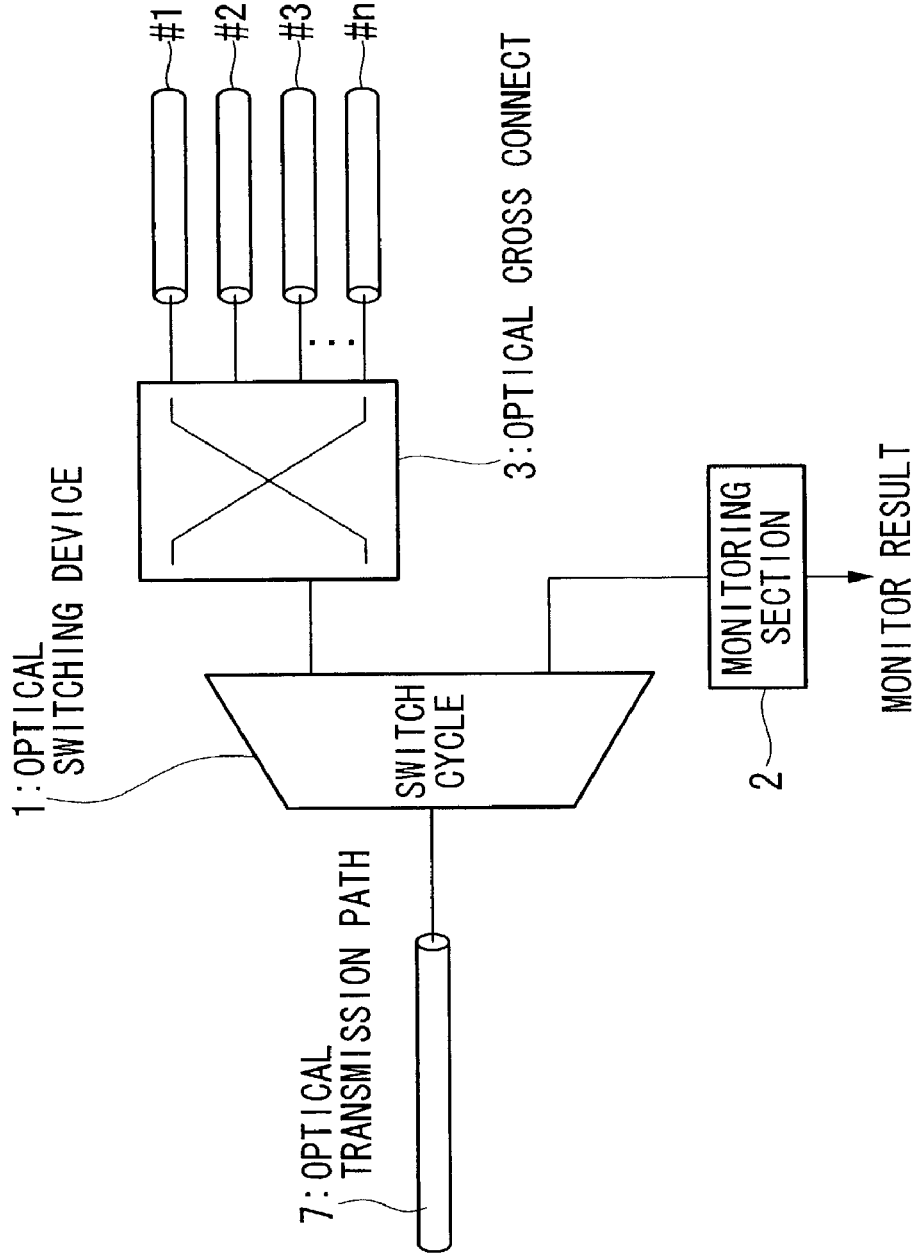
FIG. 6 is a diagram showing the constitution of a monitoring function of a third embodiment of this invention.
Figure 7:
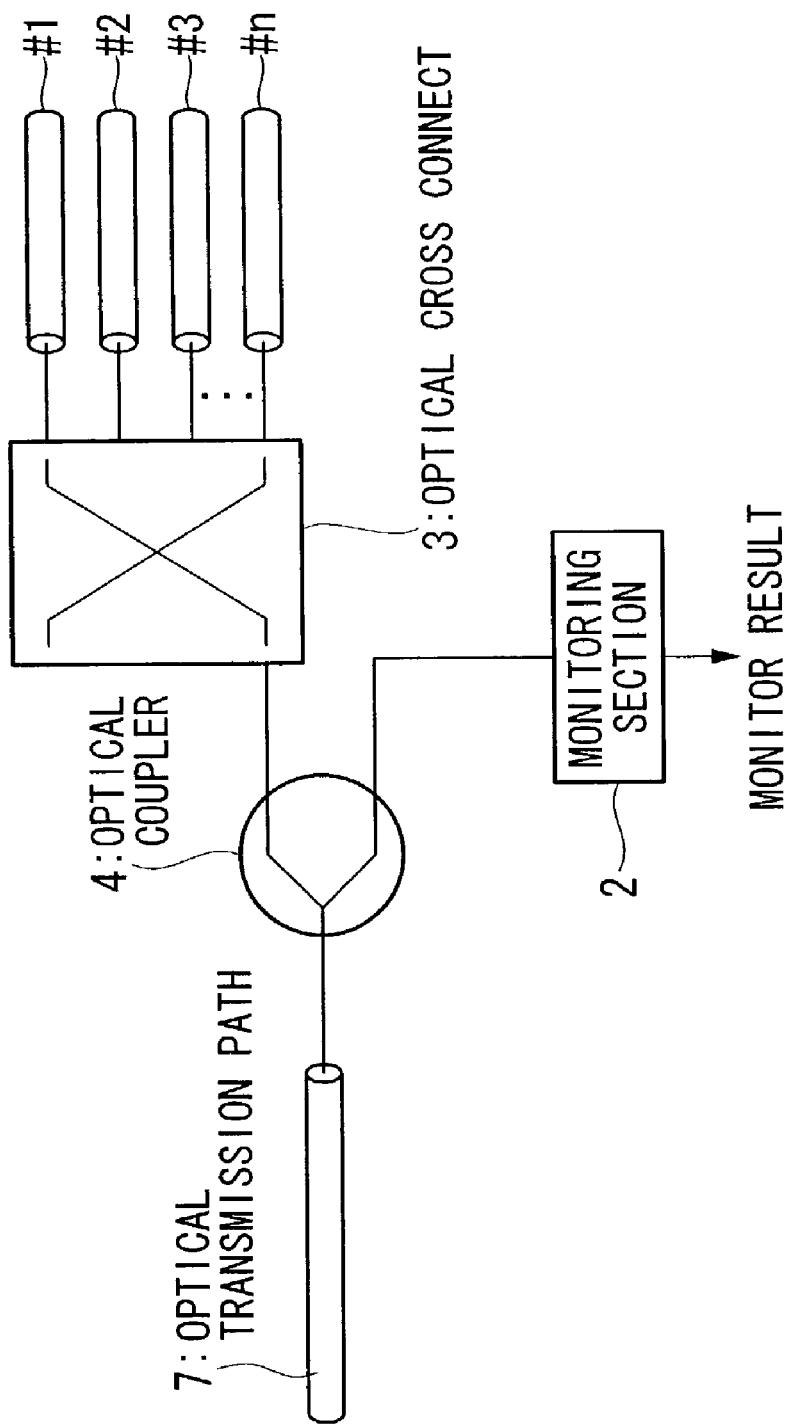
FIG. 7 is a diagram showing the constitution of a monitoring function of the third embodiment of this invention.
Figure 8:
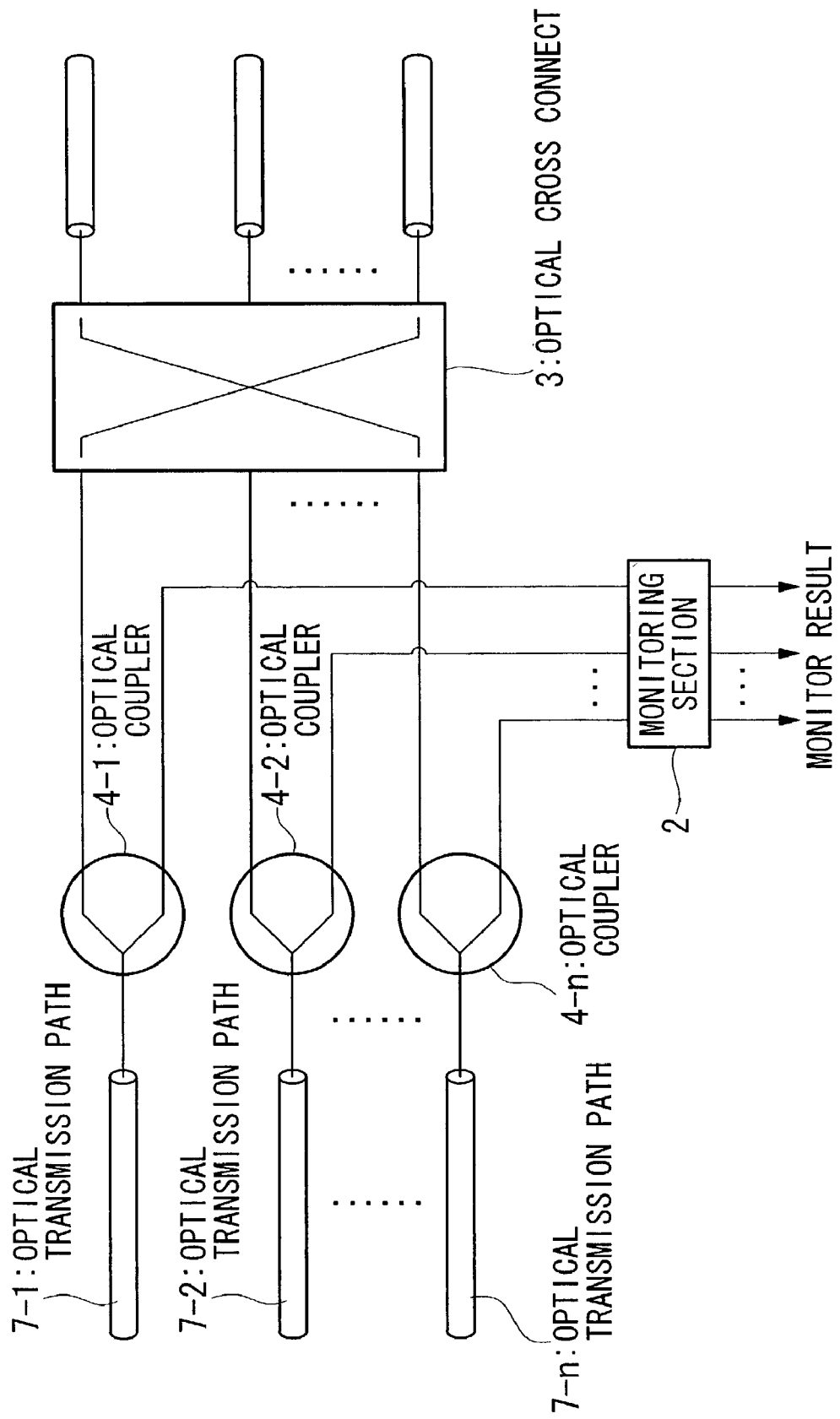
FIG. 8 is a diagram showing the constitution of a monitoring function of the third embodiment of this invention.

Subsequently, a third embodiment will be explained using FIG. 1, and FIGS. 4 to 8. FIG. 1 is a conceptual diagram showing an optical communication network according to the third embodiment of this invention. FIG. 4 is a diagram showing a preamble and a control packet, inserted into data. FIG. 5 is a diagram showing a preamble and control information, inserted into burst data. FIGS. 6 to 8 are diagrams showing the constitution of a monitoring function of the third embodiment.

As shown in FIG. 1, this invention comprises a transmission side edge node S which accommodates a data transferring source, a reception side edge node R which accommodates a data transferring destination, and relay nodes L1 to L4, provided between the transmission side edge node S and the reception side edge node R. This optical communication network has the functions of establishing and releasing a cut through path through the relay nodes L1 to L4 between the transmission side edge node S and the reception side edge node R, and a plurality of different wavelengths for transferring data $\lambda_0$ to $\lambda_n$ are set between the transmission side edge node S, the relay nodes L1 to L4, and the reception side edge node R. The functions of establishing and releasing the cut through path may be given to each of the transmission side edge node S, the relay nodes L1 to L4, and the reception side edge node R; alternatively, these functions may be appended to a single device, or dispersed across a plurality of devices for managing the establishment and release of the cut through path in an optical communication network outside the nodes. These functions are realized by using conventional technology, and are omitted from the diagrams and the explanation here.

As shown in FIG. 4, this invention is characterized in that a preamble and a packet for control, which follows the preamble and comprises control information for requesting establishment, release, or path switching of the cut through path, are inserted into the wavelength for transferring data. The invention comprises a monitoring section 2 for monitoring the preamble and the control information following the preamble at each of the plurality of wavelengths for transferring data. In compliance with the monitored result of the monitoring section 2, when the control information following the preamble requests that a cut through path be established, the cut through path is established in accordance with that request, and, as shown in FIG. 6, after the cut through path has been established, the monitoring section 2 monitors the preamble and the control information following the preamble for each of the burst data transferred along the cut through path. In compliance with the monitored result of the monitoring section 2, when the control information following the preamble requests that the cut through path be switched, the cut through path is switched in accordance with the request. In compliance with the monitored result of the monitoring section 2, when the control information following the preamble requests that the cut through path establishment be released, the cut through path establishment is released in accordance with that request.

Subsequently, the operation of the optical communication network of the third embodiment will be explained. As shown in FIG. 6, the data shown in FIG. 4 is being transferred along an optical transmission path 7. An optical switching device 1 usually connects the optical transmission path 7 to an optical cross connect 3.

When the preamble inserted into the transferred data is detected, the optical switching device 1 connects the optical transmission path 7 to the monitoring section 2. Consequently, the control information following the preamble is led to the monitoring section 2. When the control information has passed through, the optical switching device 1 reconnects the optical transmission path 7 to the optical cross connect 3.

The monitoring section 2 analyzes the received control information, and, when the control information is identified as a request to establish a cut through path, the monitoring section 2 outputs this result to the function for establishing and releasing the cut through path. The function for establishing and releasing the cut through path receives the result from the monitoring section 2, and establishes the predetermined cut through path. By the above procedures, the establishment of the cut through path is complete.

As shown in FIG. 3, after the cut through path has been established, the burst data is transferred using the cut through path. When the optical switching device 1 detects the preamble inserted into the transferred burst data, it connects the optical transmission path 7 to the monitoring section 2. Consequently, the control information following the preamble is led to the monitoring section 2. When the control information has passed, the optical switching device 1 reconnects the optical transmission path 7 to the optical cross connect 3.

The monitoring section 2 analyzes the control information it has received, and, when the control information is identified as a request to switch the cut through path (#3, #1), outputs this monitor result to the optical cross connect 3. The optical cross connect 3 receives the monitor result, and performs a predetermined switching of the cut through path. In the example shown in FIG. 5, the cut through path is switched from #3 to #1. The cut through path is switched by these procedures.

The monitoring section 2 analyzes the control information it has received, and, when the control information is identified as a request to release the cut through path (R), outputs this monitor result to the function for establishing and releasing the cut through path. The function for establishing and releasing the cut through path receives the monitor result, and performs a predetermined release of the cut through path. The cut through path is released by these procedures.

Subsequently, another constitution whereby the monitoring section 2 monitors the control information, different to that shown in FIG. 5, will be explained by referring to FIG. 7. An optical signal is output from the optical transmission path 7, split by the optical coupler 4, and partially input to the monitoring section 2. The monitoring section 2 identifies the arrival of the control information by detecting the preamble, and receives the control information following the preamble.

Subsequently, another constitution whereby the monitoring section 2 monitors the control information, different to that shown in FIGS. 6 and 7, will be explained by referring to FIG. 8. In the constitution shown in FIG. 8, one monitoring section 2 is able to monitor a plurality of optical transmission paths 7-1 to 7-n.

According to this invention, a data processing device comprising a computer device can be given the functions of establishing and releasing a cut through path between the transmission side edge node S, the relay nodes L1 to L4, and the receiving side edge node R, in an optical communication network. This is achieved by installing a program which allows the computer to execute the following functions: a first monitoring function which monitors the wavelengths for transferring data, into which have been inserted a preamble and control information, following the preamble, for requesting establishing, releasing, or path switching of the cut through path, the first monitoring function monitoring the preamble and control information following the preamble at each of the wavelengths for transferring data; an establishment function which, when the first monitoring function has determined that the control information following the preamble contains a request to establish the cut through path, establishes the cut through path in accordance with the request; a second monitoring function which, after the establishment function has established the cut through path, monitors the preamble and the control information following the preamble in burst data transferred along the cut through path; an executing function which, when the second monitoring function has determined that the control information following the preamble contains a request to switch the cut through path, executes path switching of the cut through path in accordance with the request; and a releasing function which, when the second monitoring function has determined that the control information following the preamble contains a request to release the cut through path, releases the cut through path in accordance with the request. Incidentally, the first and second monitoring functions correspond to the monitoring section 2 shown in FIGS. 6 to 8.

The program of this invention can be installed in a computer device by storing it in a recording medium of this invention. Alternatively, the program of this invention can be installed directly in the computer device via a network from a server who holds the program.

The computer device can be used to realize an optical communication network capable of efficiently transferring burst data, without needing to establish the cut through path in advance, and utilizing wavelength resources effectively.

Subsequently, fourth and fifth embodiments of this invention will be explained with reference to FIGS. 4 and 5.

Embodiment 4

Figure 9:
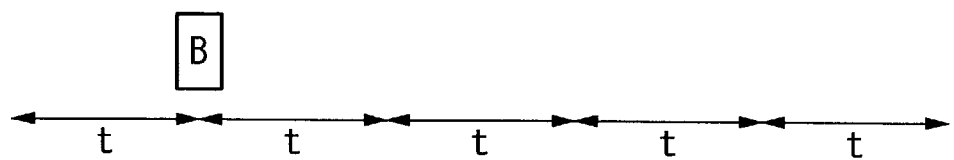
FIG. 9 is a diagram showing insertion timings of information requesting the establishment of a cut through path, established when transferring data according to a fourth embodiment of this invention.
Figure 10:
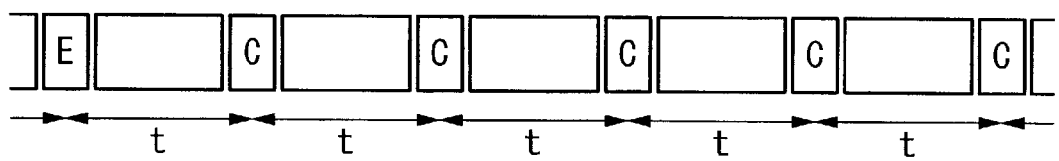
FIG. 10 is a diagram showing information requesting continuation or release of a cut through path, inserted into the burst data according to the fourth embodiment of this invention.
Figure 11:
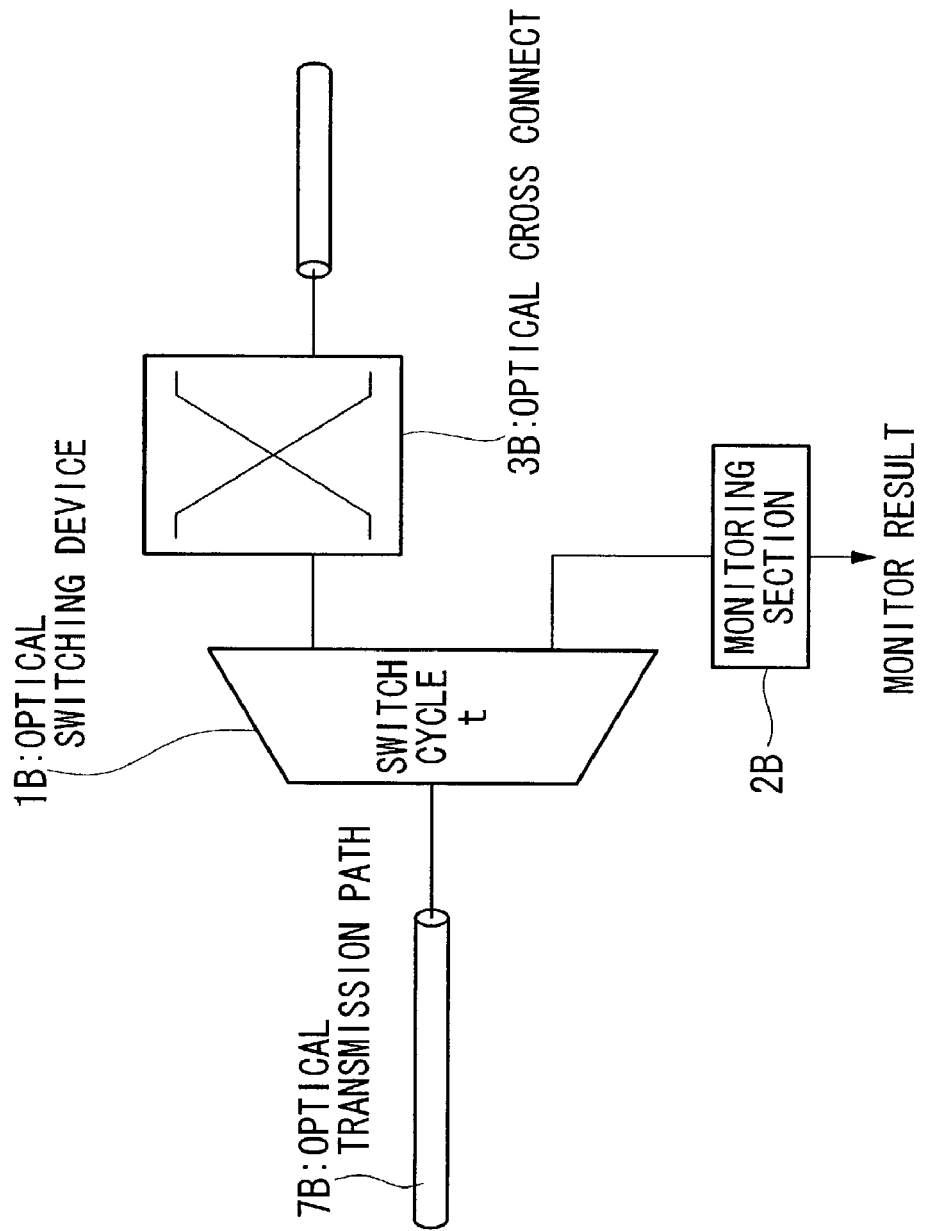
FIG. 11 is a diagram showing an optical switching device and a monitoring section of the fourth embodiment of this invention.
Figure 12:
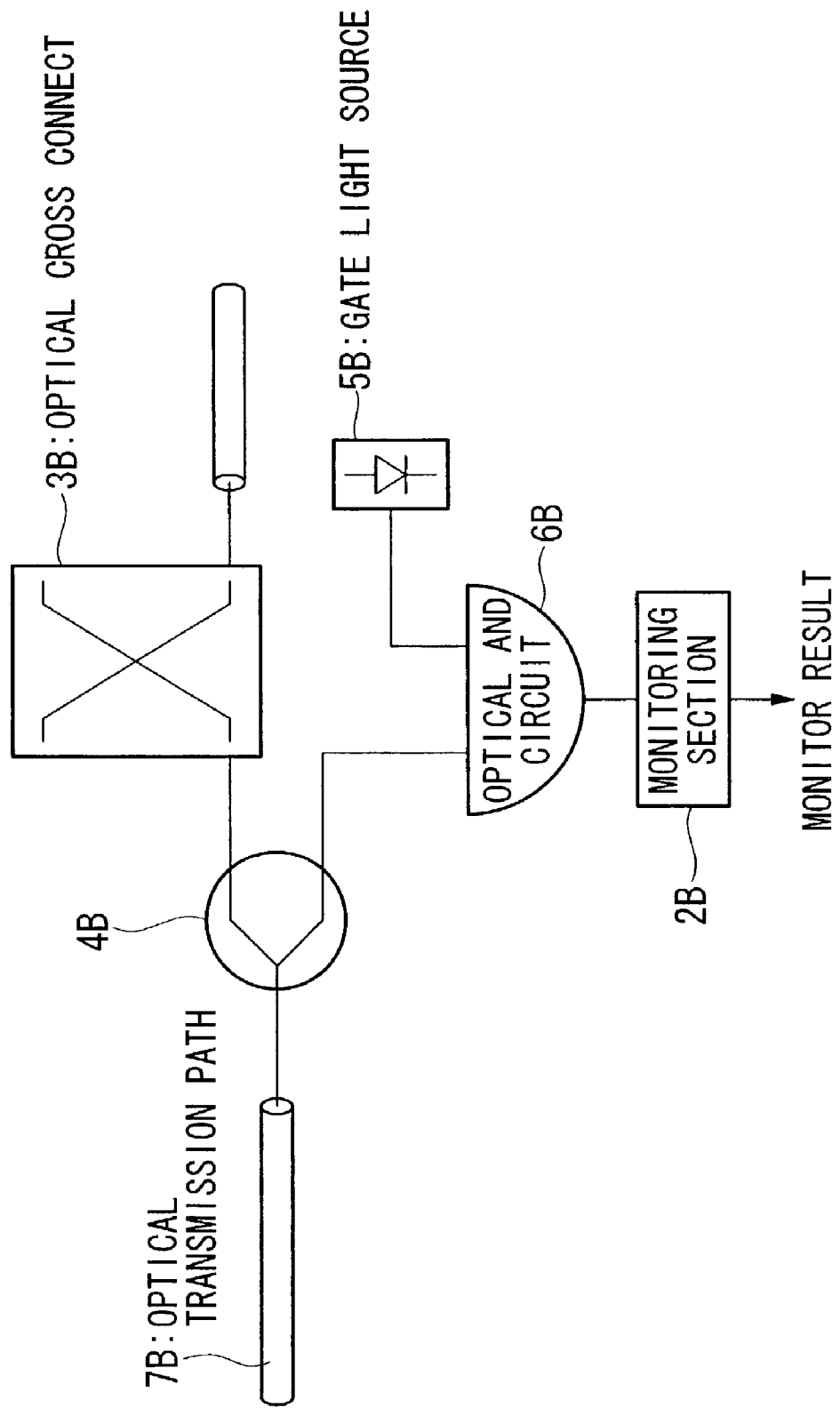
FIG. 12 is a diagram showing an optical coupler and the monitoring section of the fourth embodiment of this invention.

A fourth embodiment of this invention will be explained with reference to FIG. 1, and FIGS. 9 to 12. FIG. 1 is a conceptual diagram of an optical communication network according to the fourth embodiment. FIG. 9 shows insertion timings of information requesting the establishment of a cut through path, established when transferring data according to the fourth embodiment. FIG. 10 shows information requesting continuation or release of a cut through path, inserted into the burst data according to the fourth embodiment. FIG. 11 shows an optical switching device and a monitoring section of the fourth embodiment. FIG. 12 shows an optical coupler and the monitoring section of the fourth embodiment of this invention.

As shown in FIG. 9, this invention is characterized in that, when transferring data, a timing, which the information B requesting the establishment of a cut through path can be inserted at, is established in each cycle t. Furthermore, as shown in FIG. 11, the unit for establishing and releasing the cut through path comprises an optical switching device 1B and the monitoring section 2, which monitor the transferred data for a predetermined time in each cycle t at each of the plurality of wavelengths for transferring data; when the monitoring section 2 has extracted the information B requesting a cut through path establishment, the cut through path is established in compliance with the request. As shown in FIG. 10, after the cut through path has been established, information C and E requesting continuation and release of the cut through path are inserted in each cycle t of burst data transmitted along the cut through path. A monitoring section 2B monitors the burst data transferred along the cut through path in each cycle t for a predetermined period of time. When information requesting continuation of the cut through path has been extracted by the monitoring section 2b, the establishment of the cut through path is continued in compliance with that request. When information requesting release of the cut through path establishment has been extracted by the monitoring section 2B, the establishment of the cut through path is released in compliance with that request. In the fourth embodiment, the constitution shown in FIG. 11 is provided for each of the wavelengths for transferring data and for each of the cut through paths.

Subsequently, the operation of the optical switching device 1B and the monitoring section 2B shown in FIG. 11 will be explained. The optical switching device 1B connects the optical transmission path 7B to the optical cross connect 3B, and connects the optical transmission path 7B to the monitoring section 2B only for a predetermined period of time in each switch cycle t. Consequently, as shown in FIGS. 9 and 10, the various types of information B, C, and E inserted in cycle t can be detected. The monitor result is transmitted to the function for establishing and releasing the cut through path, which controls the cut through path accordingly.

Subsequently, a constitution whereby the monitoring section 2 monitors the information B, C, and E in each cycle t, different from that shown in FIG. 11, will be explained with reference to FIG. 12. An optical signal output from the optical transmission path 7 is split by the optical coupler 4B, and partially input to an optical AND circuit 6B. When the output from a gate light source 5B is input, the optical AND circuit 6B obtains the logical AND with the split light from the optical coupler 4B, and outputs the optical signal to the monitoring section 2B. Since the gate light source 5B only generates lights for a predetermined period of time during each cycle t, the monitoring section 2B can monitor the optical signal transmitting along the optical transmission path 7B in each cycle t. Incidentally, the optical signal split to the AND circuit 6B by the optical coupler 4B has the minimum intensity required for monitoring by the monitoring section 2B.

Embodiment 5

Figure 13:
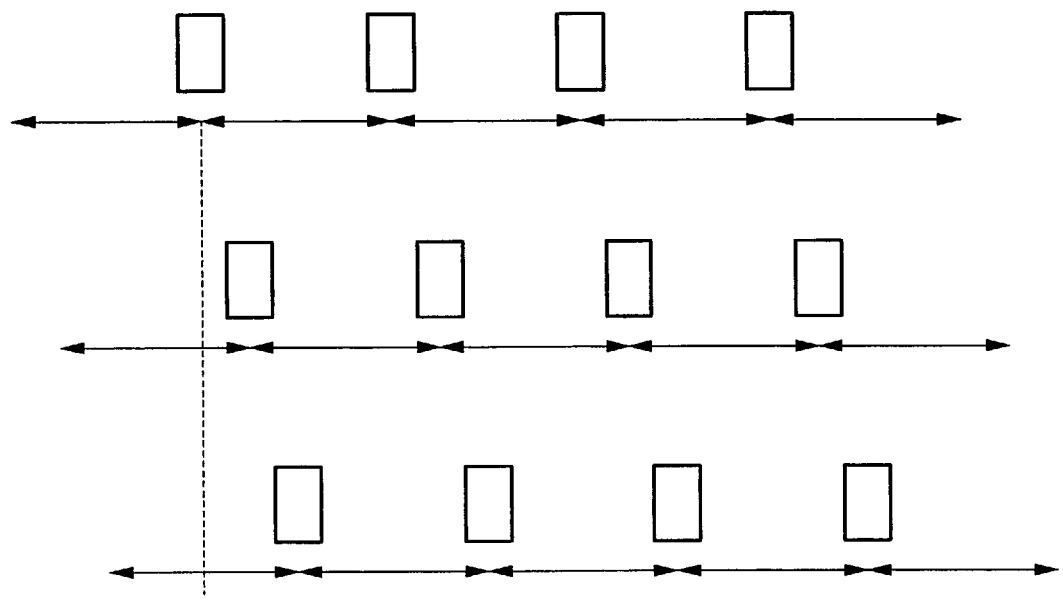
FIG. 13 is a diagram showing the insertion timings of information B, C, and E, according to a fifth embodiment of this invention.

A fifth embodiment of this invention will be explained with reference to FIGS. 13 and 14. FIG. 13 shows the insertion timings of information B, C, and E, according to the fifth embodiment. FIG. 14 shows the monitoring constitutions of information B, C, and E, according to the fifth embodiment.

As shown in FIG. 13, in the fifth embodiment, the timings of inserting the information B are set at mutually different phases at a plurality of wavelengths for transferring data, and, as shown in FIG. 14, one monitoring section 2B is provided communally for the plurality of wavelengths for transferring data, and sequentially monitors the information requesting the settings at the timings in a time-sharing arrangement. As shown in FIG. 13, the information C and E requesting continuation and release of the cut through path is inserted at mutually different phases in the burst data transmitted along the plurality of cut through paths. One monitoring section 2B is provided communally for the plurality of cut through paths, and sequentially monitors the information C and E requesting continuation and release at the timings in a time-sharing arrangement.

Subsequently, the operation of the monitoring constitution of the fifth embodiment will be explained. As shown in FIG. 13, in the fifth embodiment, the information B, C, and E are inserted at mutually different phases at the plurality of wavelengths for transferring data, and in the burst data transmitted along the plurality of cut through paths. FIG. 14 shows an example where three different optical transmission paths 7-1, 7-2, and 7-3 are provided.

Optical couplers 4B-1, 4B-2, and 4B-3 are provided respectively on the optical transmission paths 7B-1, 7B-2, and 7B-3, and output light to optical AND circuits 6B-1, 6B-2, and 6B-3 respectively. Light from a gate light source 5B is input to the optical AND circuits 6B-1, 6B-2, and 6B-3, an optical distributing device 8B splitting the output of the gate light source 5B in a time-sharing arrangement to the optical AND circuits 6B-1, 6B-2, and 6B-3 respectively. The phase different of the time-sharing is set so as to be equal to the phase different between the insertion timings shown in FIG. 13. Therefore, the optical AND circuits 6B-1, 6B-2, and 6B-3 output to an optical OR circuit 9B in correspondence with the insertion timings of the information B, C, and E of the optical transmission paths 7B-1, 7B-2, and 7B-3. The monitoring section 2B knows the time-sharing timings at which the optical distributing device 8B splits the output of the gate light source 5B in advance, and can identify the optical transmission path of the optical signal which it is presently monitoring. Consequently, one monitoring section 2B can be provided communally to handle the three optical transmission paths 7B-1, 7B-2, and 7B-3.

The node and optical communication network of the fourth and fifth embodiments can be realized using a data processing device comprising a computer device, giving the computer device functions for establishing and releasing a cut through path in an optical communication network. This is achieved by installing a program which allows the computer device to execute the following functions: a first monitoring function, corresponding to the monitoring section 2B, which monitors transferred data for a predetermined period of time in each cycle t at each of a plurality of wavelengths for transferring data, after timings, which information requesting establishment of the cut through path can be inserted at, have been in each cycle; an establishing function which, when information requesting a cut through path establishment is extracted by the first monitoring function, establishes the cut through path in accordance with the request, a second monitoring function, corresponding to the monitoring section 2B, which, when information requesting continuation or release of the cut through path is inserted in each cycle t of burst data transmitted along the cut through path established by the establishing function, monitors the burst data transferred along the cut through path for a predetermined period of time in each cycle t, a continuation function which, when information requesting continuation of the cut through path has been extracted by the second monitoring function, continues the establishment of the cut through path in compliance with the request, and a release function which, when information requesting release of the cut through path establishment has been extracted by the second monitoring function, releases the establishment of the cut through path in compliance with the request.

The timings are set at mutually different phases at the plurality of wavelengths for transferring data, the first monitoring function is set communally for the plurality of wavelengths for transferring data, and sequentially monitors the information requesting the settings at the timings in a time-sharing arrangement, the information requesting continuation and release of the cut through path is inserted at mutually different phases in the burst data transmitted along the plurality of cut through paths, and the second monitoring function is set communally for the plurality of cut through paths, and sequentially monitors the information requesting the continuation and release at the timings in a time-sharing arrangement.

The program of this invention can be installed in a computer device by storing it in a recording medium of this invention. Alternatively, the program of this invention can be installed directly in the computer device via a network from a server who holds the program.

The computer device can be used to realize an optical communication network capable of efficiently transferring burst data, without needing to establish the cut through path in advance, and utilizing wavelength resources effectively.

Subsequently, sixth to tenth embodiments of this invention will be explained with reference to FIGS. 15 to 24.

Embodiment 6

Figure 15:
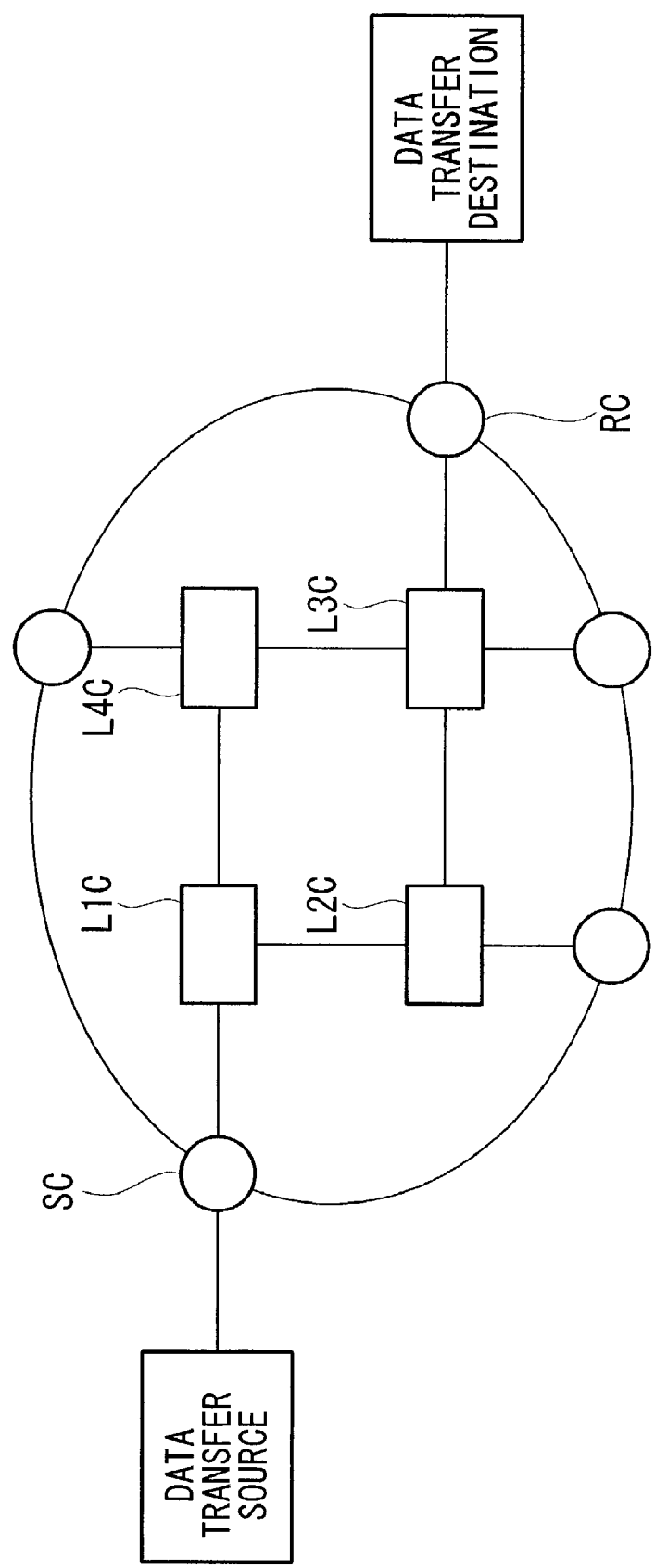
FIG. 15 is a conceptual diagram of an optical communication network according to embodiments six to ten.
Figure 16:
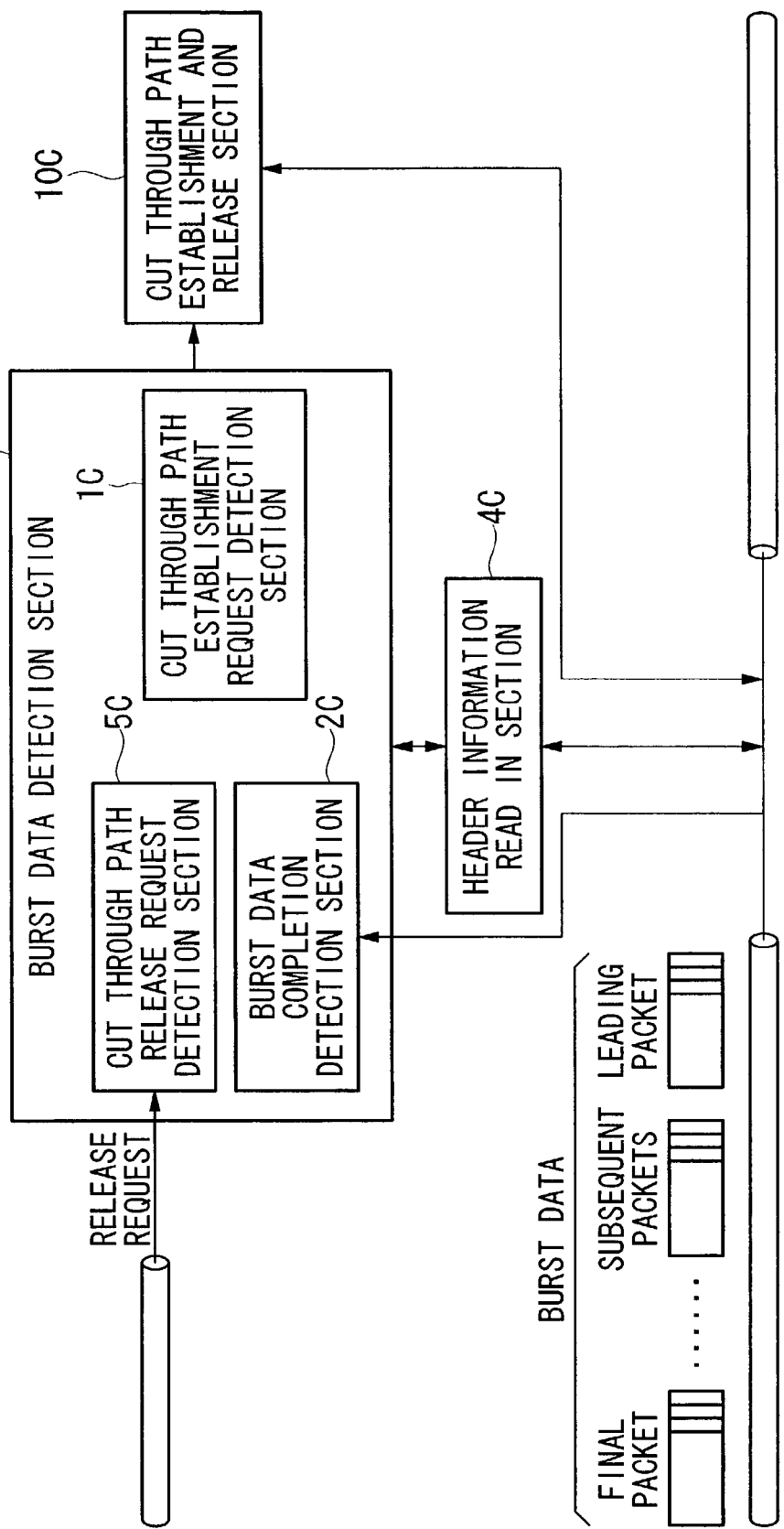
FIG. 16 is a block diagram showing a burst data detection section and a cut through path establishing and releasing section of the sixth embodiment of this invention.
Figure 17:
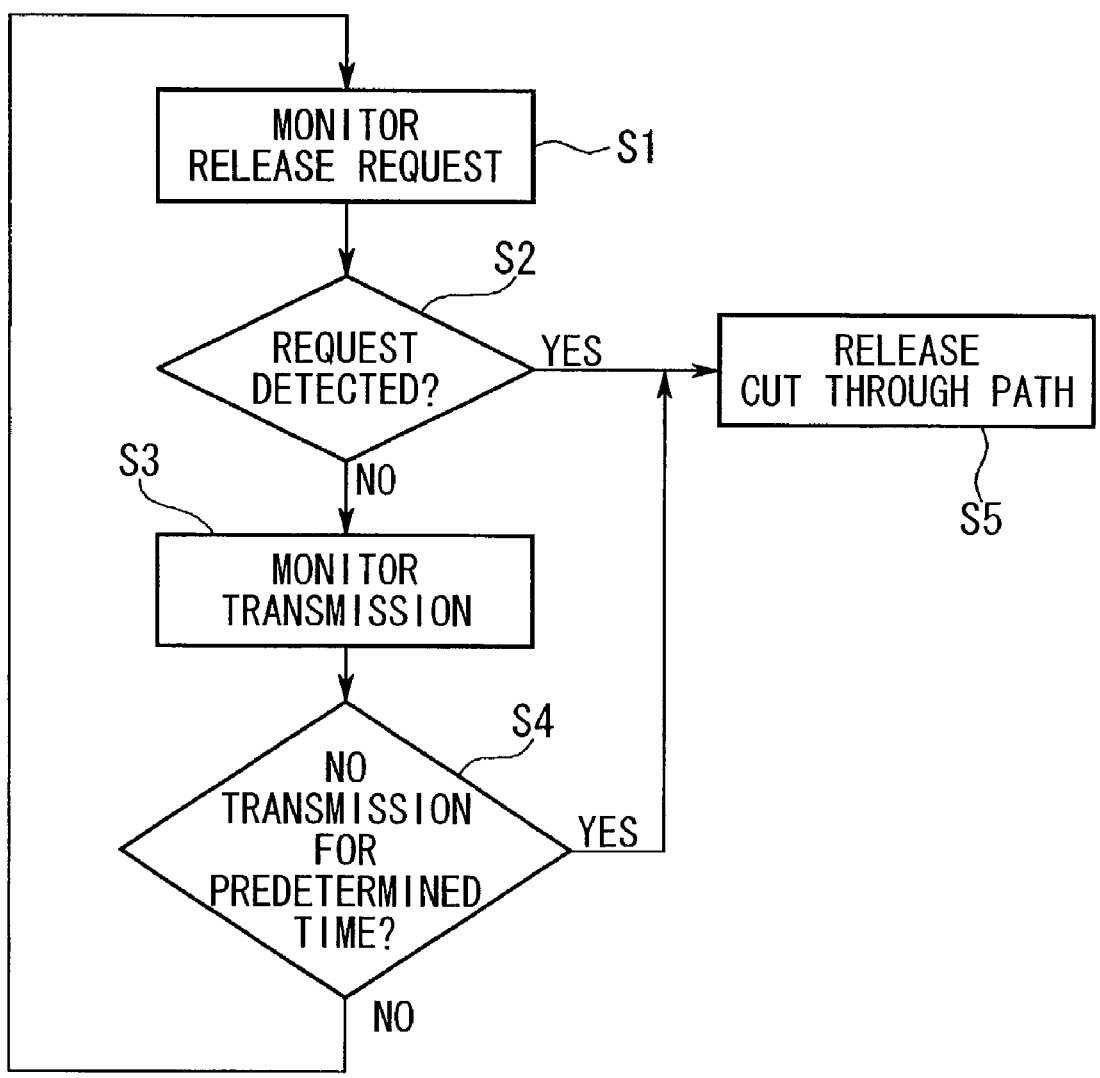
FIG. 17 is a flowchart showing cut through path release procedures of the sixth and eighth embodiments of this invention.

The optical communication network according to a sixth embodiment of this invention will be explained with reference to FIGS. 15 to 17. FIG. 15 is a conceptual diagram showing an optical communication network according to the sixth to tenth embodiments. FIG. 16 is a block diagram showing the constitution of a burst data detection section and a cut through path establishing and releasing section of the sixth embodiment. FIG. 17 is a flowchart showing cut through path release procedures of the sixth embodiment.

As shown in FIG. 15, the sixth to tenth embodiments of this invention provide an optical communication network comprising a transmitting side edge node S, which accommodates a data transferring source, a receiving side edge node R, which accommodates a data transferring destination, and relay nodes L1 to L4, which connect the transmitting side edge node S and the receiving side edge node R. The network has a function for establishing and releasing a cut through path via the relay nodes L1 to L4 between the transmitting side edge node S and the receiving side edge node R. In this embodiment, this function for establishing and releasing the cut through path corresponds to a cut through path establishing and releasing section 10C, shown in FIG. 16, and may be provided for each of the transmitting side edge node S, the receiving side edge node R, and the relay nodes L1 to L4; alternatively, the function may be appended to a single device, or dispersed across a plurality of devices for managing the establishment and release of the cut through path in an optical communication network outside the nodes. The function is realized by using conventional technology, omitted from the diagrams and the present explanation.

As shown in FIG. 16, this invention is characterized in that it has a cut through path establishment request detection section 1C, which detects the arrival of a cut through path establishment request packet at the transmitting side edge node S and the relay nodes L1 to L4. When the cut through path establishment request detection section 1C has detected the arrival of a cut through path establishment request packet at the transmitting side edge node S and the relay nodes L1 to L4, the cut through path establishing and releasing section 10C establishes a cut through path from the transmitting side edge node S and the relay nodes L1 to L4 to a node of the next stage. A header information reading section 4C analyzes the header information of the IP packet, and notifies the cut through path establishment request detection section 1C of the result of this analysis. Consequently, even while data is being transferred, the cut through path can be established at a given timing.

Furthermore, an optical path is provided for transmitting a request to release the cut through path established by the cut through path establishing and releasing section 10C. When the request to release the cut through path has arrived via the optical path at a cut through path release request detection section 5C, the cut through path establishing and releasing section 10C releases the cut through path.

Also provided is a burst data completion detection section 2C which detects whether a communication has been made using the cut through path, established by the cut through path establishing and releasing section 10C. When the burst data completion detection section 2C has detected no communication for a period exceeding a predetermined period of time, the cut through path is released.

Procedures for releasing the cut through path according to the sixth embodiment will be explained with reference to FIG. 17. The cut through path release request detection section 5C monitors requests to release the cut through path (S1), and, when a release request is detected (S2), the cut through path is released in accordance with that request (S5). Even when no release request is detected (S2), the burst data completion detection section 2C monitors communications using the cut through path (S3), and, when no communication is detected for a predetermined period of time (S4), the cut through path is released (S5). Consequently, the cut through path can be released at a given time during data transferring. In addition, even when no request has been received, the cut through path can be released by detecting that no communications have been made using the cut through path. This enables wavelength resources to be used effectively.

Embodiment 7

Figure 19:
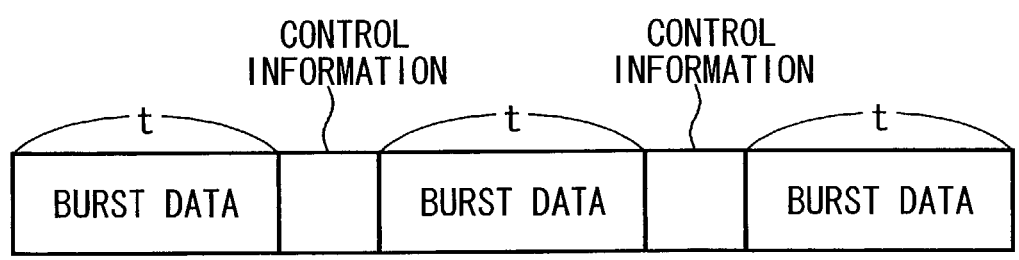
FIG. 19 is a diagram showing control information inserted into burst data.
Figure 18:
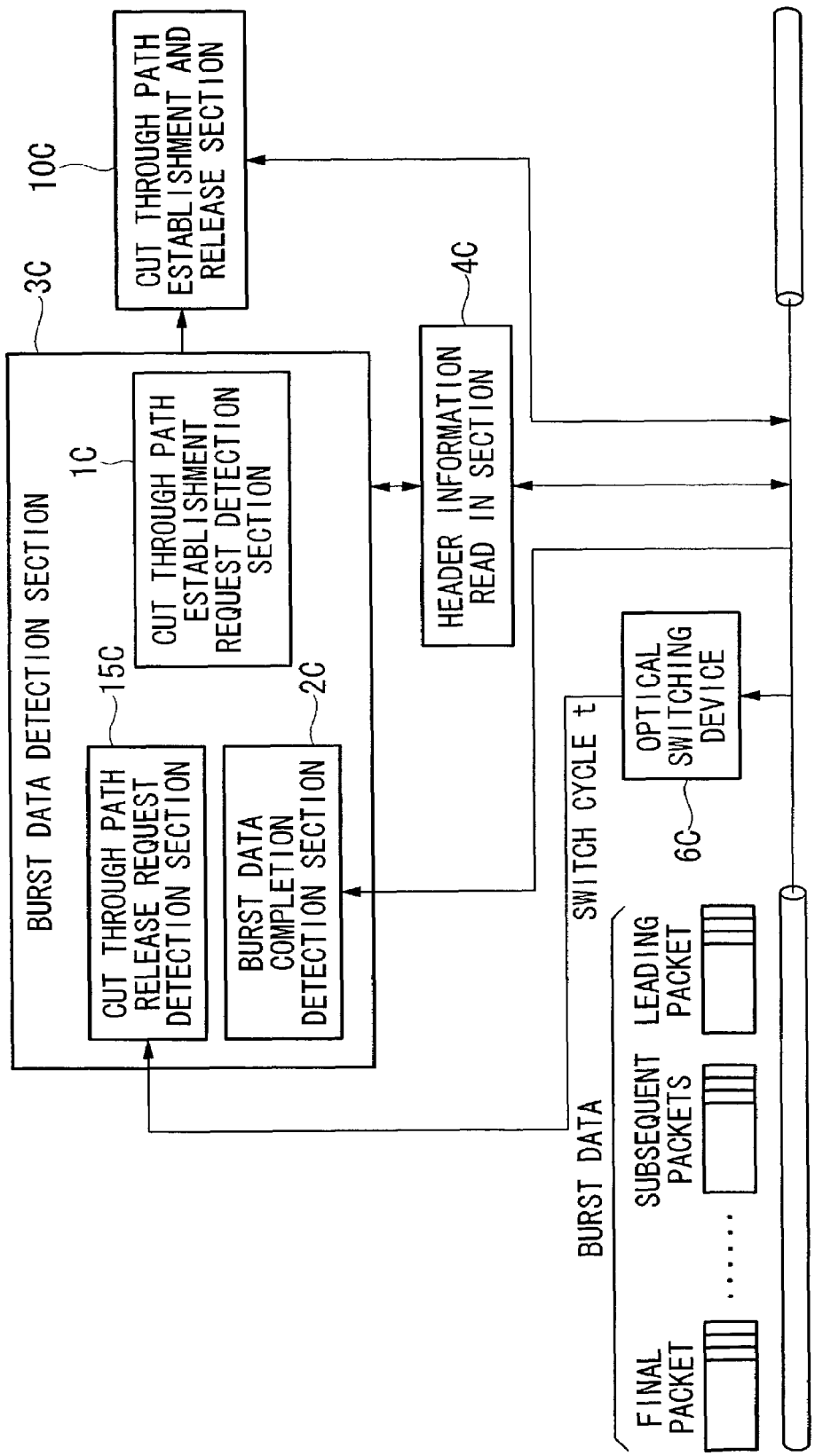
FIG. 18 is a block diagram showing a burst data detection section and a cut through path establishing and releasing section of the seventh embodiment of this invention.
Figure 20:
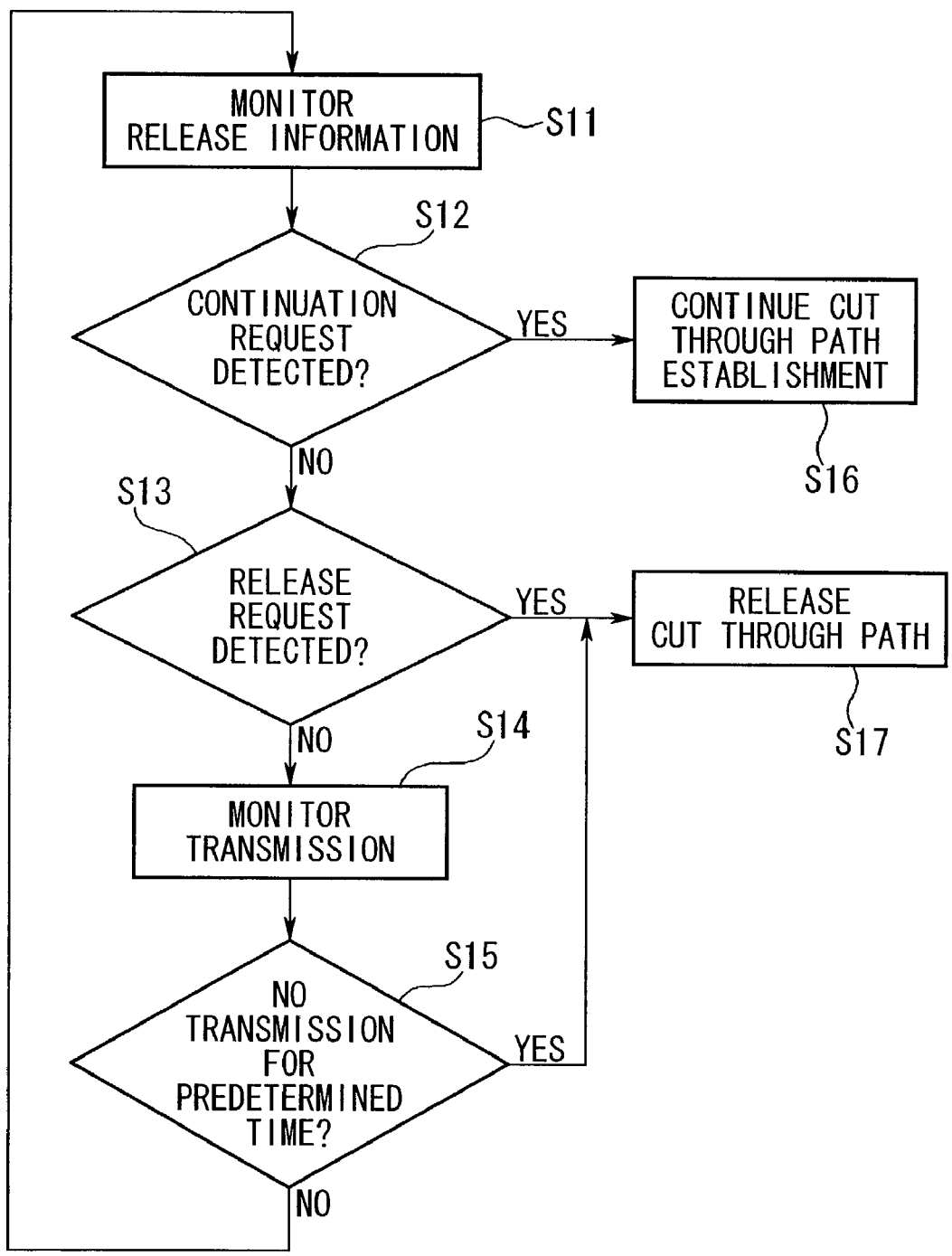
FIG. 20 is a flowchart showing cut through path release procedures of the seventh embodiment of this invention.

A seventh embodiment of this invention will be explained with reference to FIGS. 18 to 20. FIG. 18 is a block diagram showing a burst data detection section and a cut through path establishment release section of the seventh embodiment. FIG. 19 is a diagram showing control information inserted into burst data. FIG. 20 is a flowchart showing cut through path release procedures of the seventh embodiment.

As shown in FIG. 19, according to the seventh embodiment, insertion timing for inserting control information is provided in each cycle t of the cut through path established by the cut through path establishing and releasing section 10C. The insertion timings are monitored by a cut through path release request detection section 15C. When the cut through path release request detection section 15C has detected control information requesting the continuation of the cut through path, the cut through path establishing and releasing section 10C continues the establishment of the cut through path. On the other hand, when the cut through path release request detection section 15C has detected control information requesting the release of the cut through path, the cut through path establishing and releasing section 10C releases the cut through path.

The optical switching device 6C connects the cut through path to the cut through path release request detection section 15C for a predetermined period of time during a switch cycle t. Therefore, the cut through path release request detection section 15C can extract the control information, inserted into the burst data in each cycle.

As in the sixth embodiment, the burst data completion detection section 2C detects whether any communications have been transmitted along the cut through path, which was established by the cut through path establishing and releasing section 10C. When the burst data completion detection section 2C has detected no communication for a period exceeding a predetermined period of time, the cut through path is released.

Procedures for releasing the cut through path according to the seventh embodiment will be explained with reference to FIG. 20. The release request detection section 15C monitors the control information, inserted in each cycle t of the burst data (S11), and, when a request to continue the cut through path is detected in the control information (S12), the cut through path establishing and releasing section 10C continues the establishment of the cut through path (S16). When a request to release the cut through path is detected in the control information (S14), the cut through path establishing and releasing section 10C releases the cut through path (S17). Moreover, the burst data completion detection section 2C detects whether any communications have been transmitted along the cut through path, and, even when no release request has been detected in the control information, when no communication is detected for a predetermined period of time, the cut through path is released (S17).

Consequently, the cut through path can be released at a given timing while transferring data. In addition, even when no release request has been made, the cut through path can be released by detecting no communication using the cut through path, thereby using wavelength resources effectively.

Embodiment 8

Figure 21:
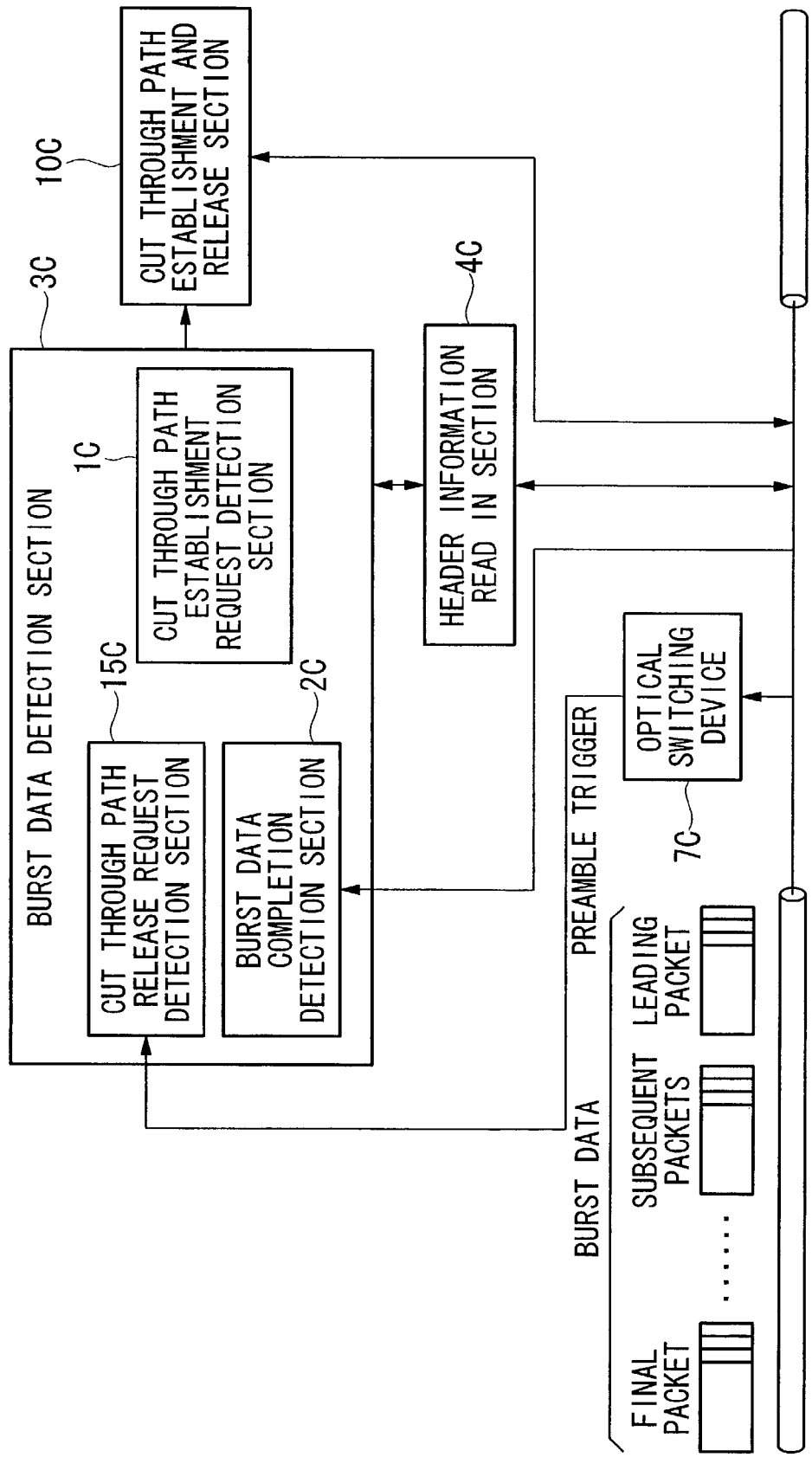
FIG. 21 is a block diagram showing a burst data detection section and a cut through path establishing and releasing section of the eighth embodiment of this invention.
Figure 22:
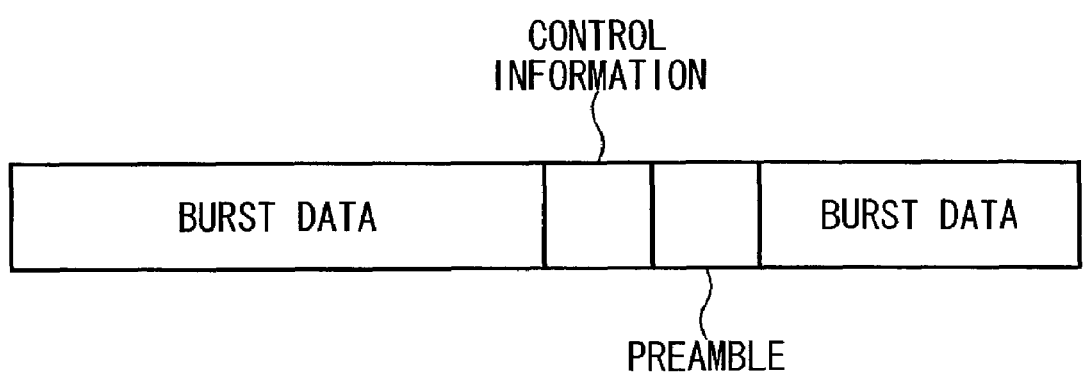
FIG. 22 is a diagram showing a preamble and control information, inserted into burst data.

An eighth embodiment of this invention will be explained with reference to FIGS. 17, 21, and 22. FIG. 17 is a flowchart showing procedures for releasing the cut through path according to the eighth embodiment, and is the same as the sixth embodiment. FIG. 21 is a block diagram showing a burst data detection section and a cut through path establishing and releasing section of the eighth embodiment. FIG. 22 is a diagram showing a preamble and control information, inserted into burst data.

As shown in FIG. 22, according to the eighth embodiment, a preamble and control information following the preamble are inserted into the cut through path which was established by the cut through path establishing and releasing section 10C. As shown in FIG. 21, when the preamble has been detected, the release request detection section 15C detects the control information following the preamble. When the release request detection section 15C has detected a release request in the control information, the cut through path establishing and releasing section 10C releases the cut through path.

Since it is known that control information is inserted after a preamble transferred along the cut through path, when a preamble is detected, the optical switching device 7C connects the cut through path to the release request detection section 15C for a predetermined period of time, using the preamble as a trigger. Consequently, the release request detection section 15C can extract the control information inserted immediately after the preamble of the burst data.

Furthermore, as in the sixth embodiment, the burst data completion detection section 2C detects whether any communications have been transmitted along the cut through path, which was established by the cut through path establishing and releasing section 10C. When the burst data completion detection section 2C has detected no communication for a period exceeding a predetermined period of time, the cut through path is released.

Procedures for releasing the cut through path according to the eighth embodiment will be explained with reference to FIG. 17. The cut through path release request detection section 5C extracts the control information inserted into the burst data. In the eighth embodiment, the control information only contains a request to release the cut through path, and for this reason there is no need to analyze the control information. In this way, requests to release the cut through path are monitored (S1), and, when a release request is detected (S2), the cut through path is released in accordance with that request (S5). Even when no release request is detected (S2), the burst data completion detection section 2C monitors communications using the cut through path (S3), and, when no communication is detected for a predetermined period of time (S4), the cut through path is released (S5). Consequently, the cut through path can be released at a given time during data transferring. In addition, even when no request has been received, the cut through path can be released by detecting that no communications have been made using the cut through path. This enables wavelength resources to be used effectively.

Embodiment 9

Figure 23:
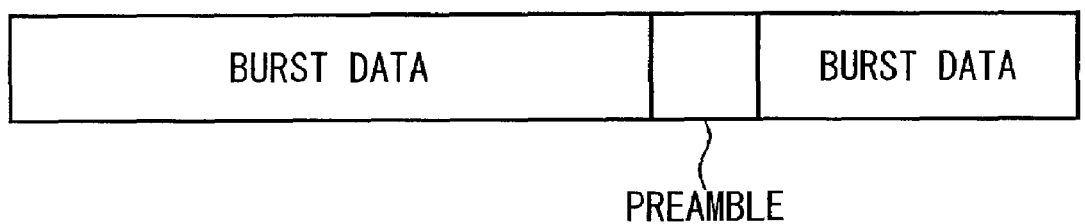
FIG. 23 is a diagram showing a preamble, inserted into burst data.
Figure 24:
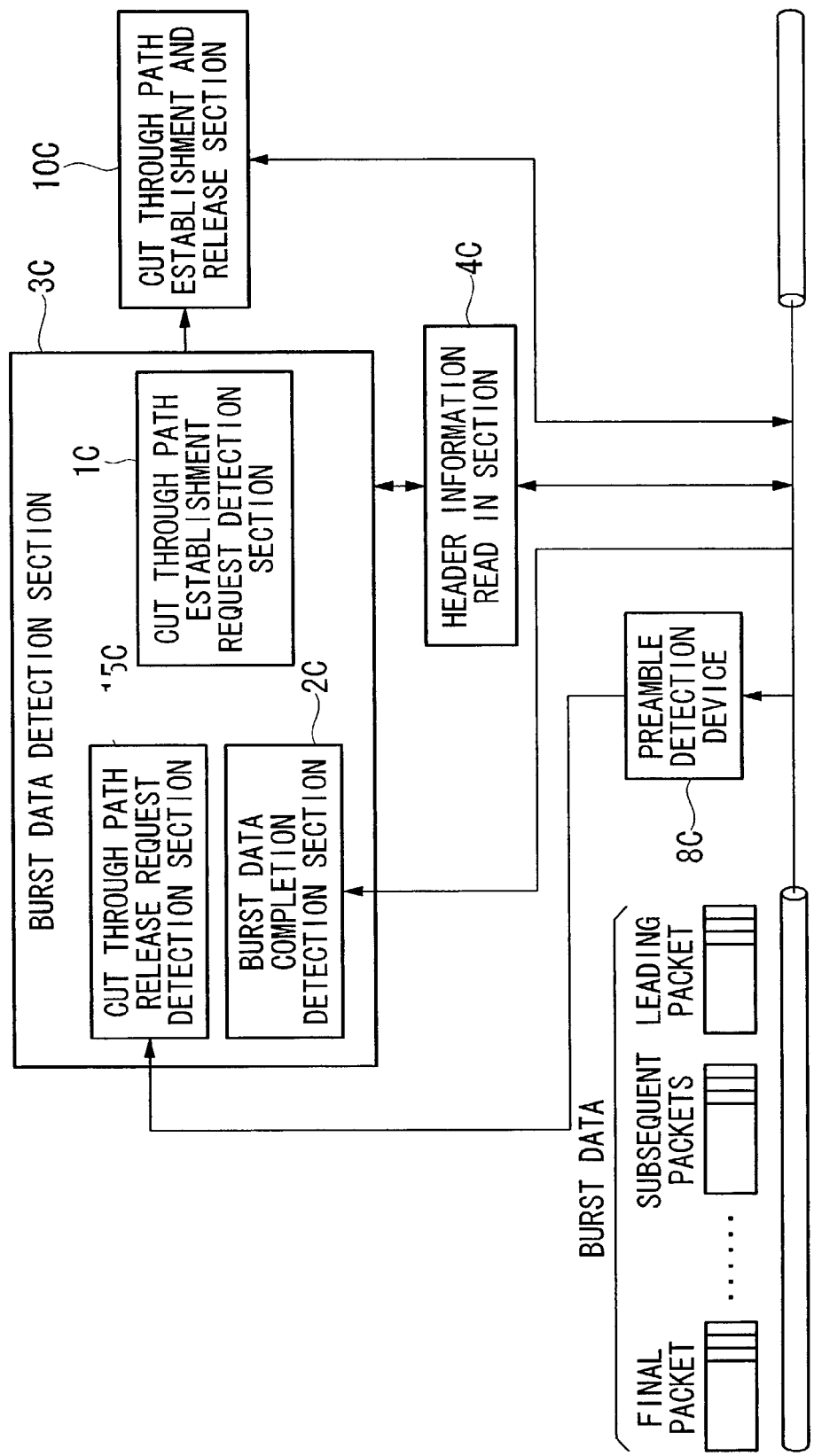
FIG. 24 is a block diagram showing a burst data detection section and a cut through path establishing and releasing section of the ninth embodiment of this invention.

A ninth embodiment of this invention will be explained with reference to FIGS. 17, 23, and 24. FIG. 23 shows a preamble, inserted into burst data. FIG. 24 is a block diagram showing a burst data detection section and a cut through path establishing and releasing section of the ninth embodiment. The ninth embodiment defines the insertion of a preamble into burst data as a request to release the cut through path. The release request detection section 15C interprets the detection of the preamble as a request to release the cut through path, allowing the control information following the preamble to be omitted.

As shown in FIG. 23, according to the ninth embodiment, a preamble is inserted into the cut through path established by the cut through path establishing and releasing section 10C, and, as shown in FIG. 24, when the preamble is detected, the cut through path establishing and releasing section 10C releases the cut through path.

A preamble detection section 8C monitors the preamble transferred on the cut through path, and notifies the release request detection section 15C when a preamble is detected. Therefore, the release request detection section 15C can identify a request to release the cut through path by the detection of the preamble.

Furthermore, as in the sixth and seventh embodiments, the burst data completion detection section 2C detects whether any communications have been transmitted along the cut through path, which was established by the cut through path establishing and releasing section 10C. When the burst data completion detection section 2C has detected no communication for a period exceeding a predetermined period of time, the cut through path is released.

Procedures for releasing the cut through path according to the ninth embodiment will be explained with reference to FIG. 17. The cut through path release request detection section 5C extracts the preamble inserted into the burst data. In the ninth embodiment, the preamble itself is the release request. In this way, the request to release the cut through path is monitored (S1), and, when a release request is detected (S2), the cut through path is released in accordance with the request (S5). Even when no release request is detected (S2), the burst data completion detection section 2C monitors communications using the cut through path (S3), and, when no communication is detected for a predetermined period of time (S4), the cut through path is released (S5). Consequently, the cut through path can be released at a given time during data transferring. In addition, even when no request has been received, the cut through path can be released by detecting that no communications have been made using the cut through path. This enables wavelength resources to be used effectively.

Embodiment 10

The nodes according to the sixth to ninth embodiments of this invention can be realized by using an information processing device comprising a computer device. That is, by installing an appropriate program in the computer device, the computer device can be given the function of establishing and releasing a cut through path via the relay nodes L1 to L4 between the transmitting side edge node S and the receiving side edge node R. The program enables the computer device to realize the node of this invention by giving it the following functions: a function of detecting the arrival of a request packet to establish a cut through path at the transmission side edge node S and the relay nodes L1 to L4, corresponding to the cut through path establishment request detection section 1C, and a function for establishing a cut through path from the transmitting side edge node S and the relay nodes L1 to L4 to a node of the next stage when the cut through path establishment request detection section 1C has detected the arrival of a request packet to establish a cut through path, corresponding to the cut through path establishing and releasing section 10C.

As shown in FIG. 16, an optical path is provided for transmitting a request to release the cut through path established by the cut through path establishing and releasing section 10C. When the request to release the cut through path has arrived via the optical path, the computer device executes the function of releasing the cut through path.

Alternatively, as shown in FIG. 19, insertion timings for control information are provided in the cut through path established by the establishment function, and the program of this invention allows the computer device to realize the following functions, as shown in FIG. 18: a function, corresponding to the release request detection section 15C, for monitoring the insertion timings, a continuation function which, when information requesting continuation of the cut through path has been detected, continues the establishment of the cut through path, and a release function which, when information requesting release of the cut through path establishment has been detected, releases the establishment of the cut through path.

Alternatively, as shown in FIG. 22, a preamble and control information following the preamble are inserted in the cut through path established by the establishment function, and the program allows the computer device to execute the following functions: a function of detecting the control information following the preamble when the preamble has been detected, corresponding to the release request detection section 15C, and a function of releasing the cut through path when the control information detected by the detecting function is a request to release the cut through path.

Alternatively, as shown in FIG. 23, a preamble is inserted into the cut through path established by the establishment function, and the program of this invention allows the computer device to execute the functions of monitoring the preamble, and releasing the cut through path when the preamble has been detected.

Further, the computer is allowed to execute a function, corresponding to the burst data completion detection section 2C, which detects whether there has been a communication using the cut through path, established by the establishment function, and a releasing function which releases the cut through path when no communication has been detected for a predetermined period of time.

The program of this invention can be installed in a computer device by storing it in a recording medium of this invention. Alternatively, the program of this invention can be installed directly in the computer device via a network from a server who holds the program.

The computer device can be used to realize an optical communication network capable of efficiently transferring burst data, without needing to establish the cut through path in advance, and utilizing wavelength resources effectively.

Subsequently, eleventh to thirteenth embodiments of this invention will be explained with reference to FIGS. 25 to 27.

Embodiment 11

A node and optical path network according to the eleventh embodiment of this invention will be explained with reference to FIGS. 25 and 26. FIG. 25 shows the constitution of an optical path network according to an eleventh embodiment. FIG. 26 is a block diagram showing the constitution of a node in the eleventh embodiment.

As shown in FIGS. 1 and 2, the first embodiment provides a node comprising an optical packet for test transmitting section 1 which, prior to the establishment of an optical path, transmits an optical packet for test along the path where the optical path is to be established, a signal quality decision section 4 which receives the optical packet for test and determines its signal quality, a deterioration notifying section 5 which, when the determining unit has determined that the signal quality has deteriorated, notifies the node of the preceding stage of that fact, and a trunk for 3R 3 and 3R control section 6 which receive the notification and execute 3R processing of subsequent optical packets traveling along the path.

Figure 25:
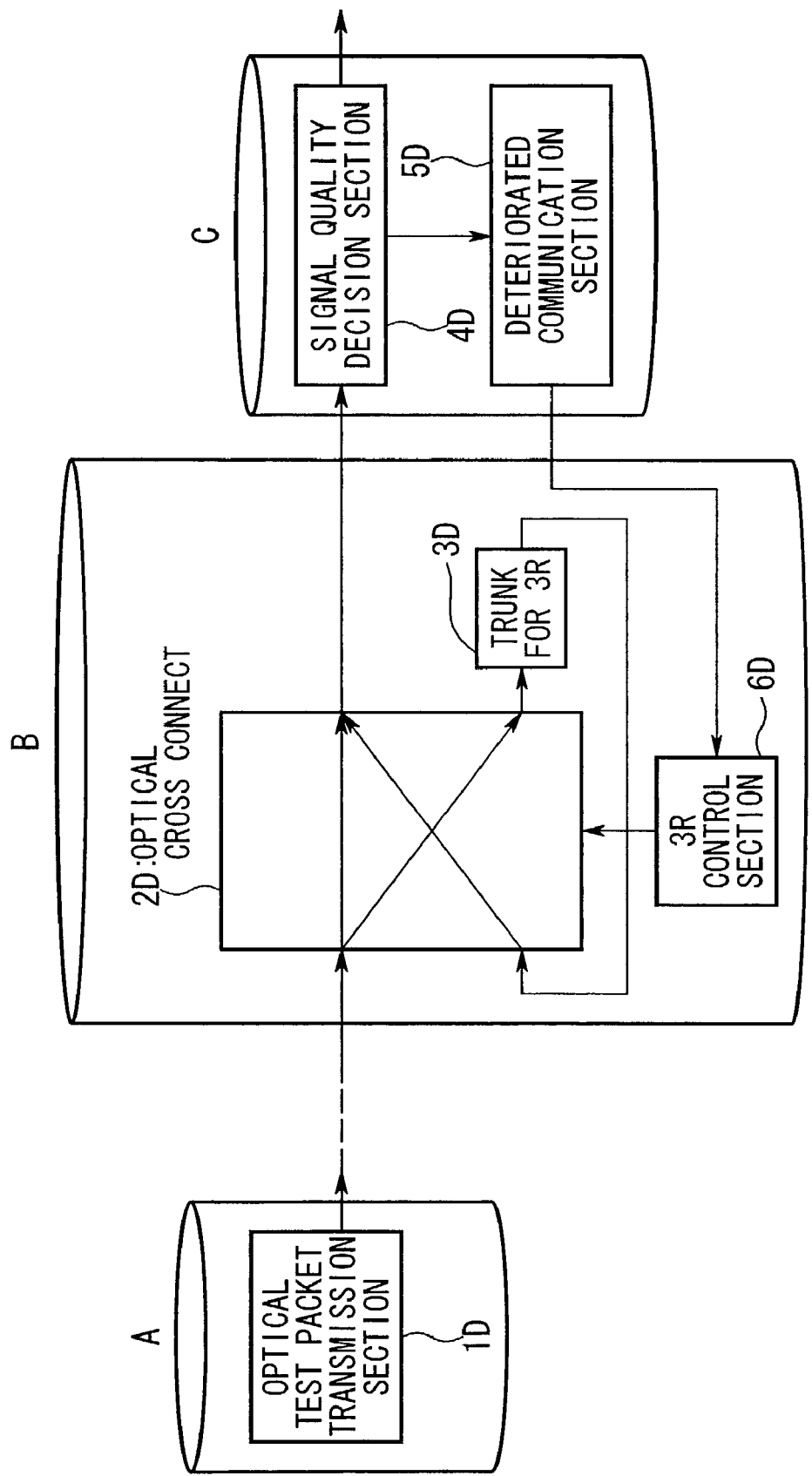
FIG. 25 is a diagram showing the constitution of an optical path network according to an eleventh embodiment of this invention.
Figure 26:
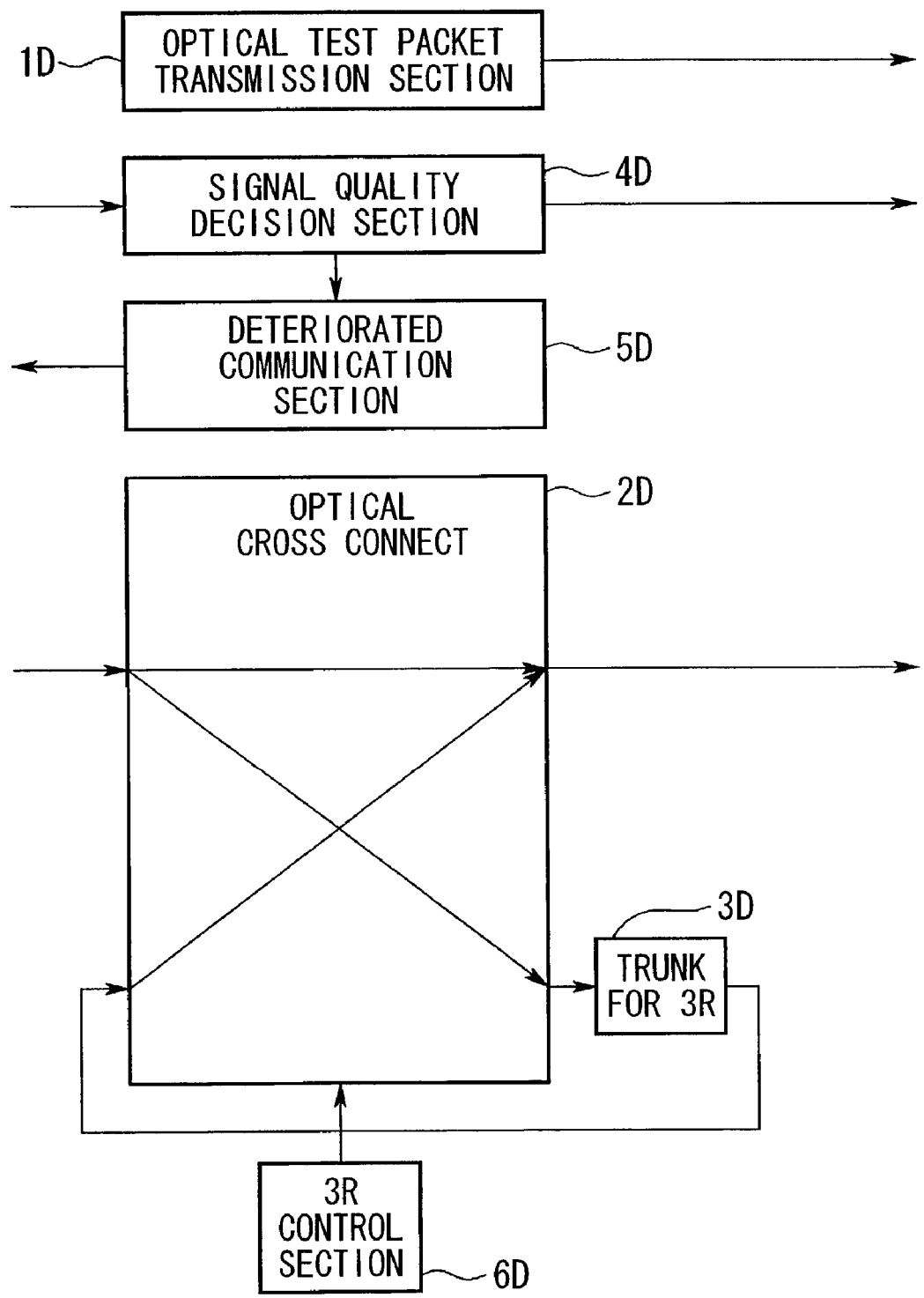
FIG. 26 is a block diagram showing the constitution of a node in the eleventh embodiment of this invention.
Figure 27:
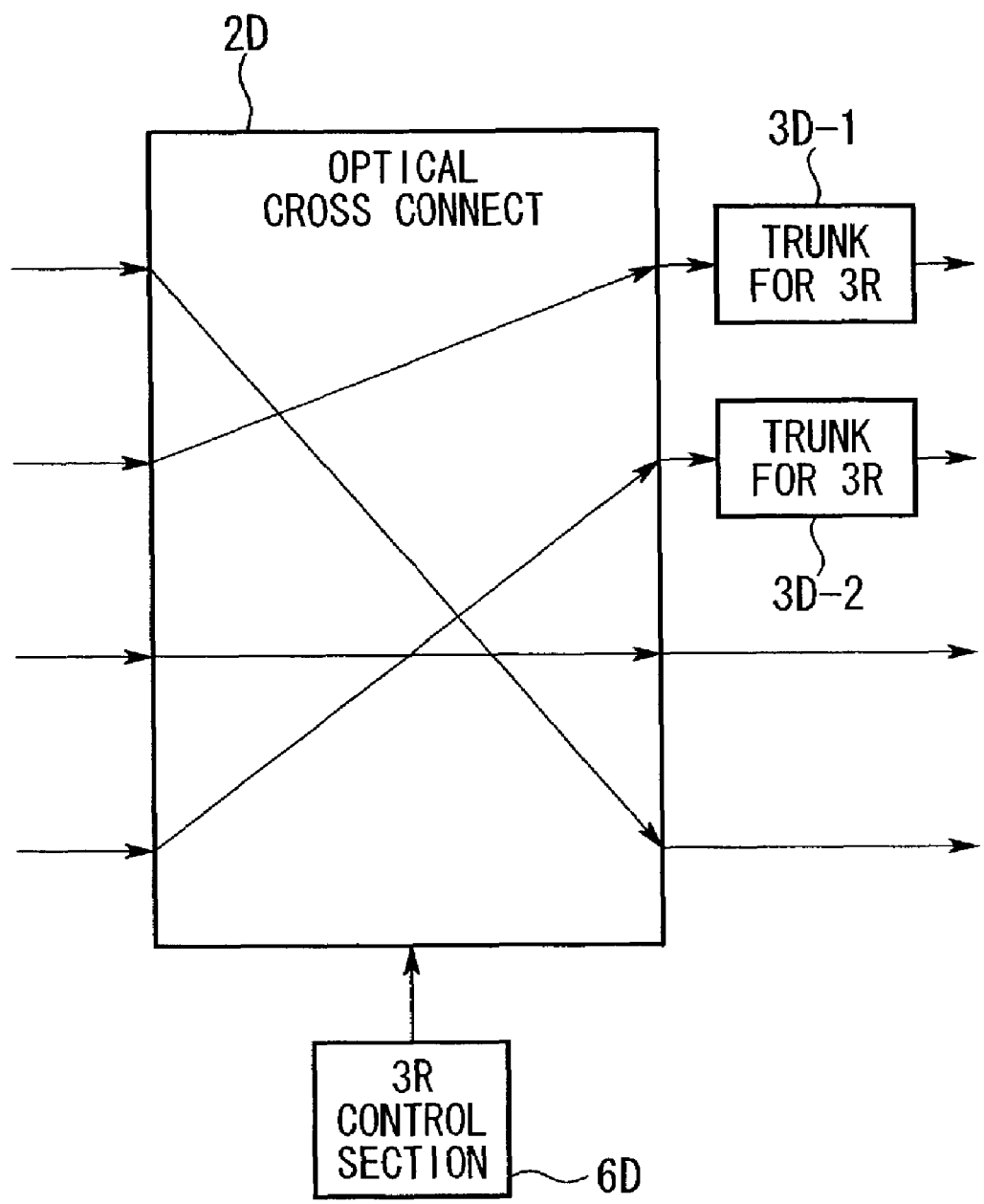
FIG. 27 is a diagram showing the 3R processing constitution of a twelfth embodiment of this invention.

In order to make the explanation easier to understand, FIG. 25 shows an example where the nodes A to C have different block constitutions, but in reality, as shown in FIG. 26, the nodes A to C share the same block constitution, the block constitution of each node being determined by its purpose, as shown in FIG. 25.

The operation of the optical path network of the eleventh embodiment will be explained with reference to FIG. 25. Prior to establishing the optical path, an optical-packet-for-test transmitting device 1D on the transmitting side transmits an optical packet for test along the planned route of the optical path. Signal quality decision sections 4D at each node determine the signal quality of the optical packet for test. When the signal quality decision section 4D at the node C detects deterioration in the signal quality, the deterioration notifying section 5D notifies the node B of the preceding stage of this fact. The 3R control section 6D of the node B which received the notification of the deterioration, controls the optical cross connect 2D and connects the path of the optical packet for test to the trunk for 3R 3D. Consequently, the data transmitted along the path is 3R processed.

After the test of the path through nodes A to C has ended, the cut through path is established and burst data is transferred along it. In transferring burst data along the cut through path, the data is transferred from node A to node B without converting the optical signal to an electrical signal. At node B, the optical signal is temporarily converted to an electrical signal for 3R processing, and the 3R processed electrical signal is then converted back to an optical signal, and transmitted to the node C.

In this embodiment, since the position for 3R processing can be identified by using the optical packet for test, the position can be identified more easily and reliably than by the conventional method of calculation, eliminating the time taken by this calculation.

Embodiment 12

A twelfth embodiment of this invention will be explained with reference to FIG. 27. FIG. 27 shows a 3R processing constitution according to the twelfth embodiment. The 3R processing constitution of the twelfth embodiment is characterized in that trunks for 3R 3D-1 and 3D-2 are provided at output ports of the optical cross connect 2D. Therefore, the 3R processing path does not loop back, as in the eleventh embodiment, consequently requiring fewer wavelength conversions than the eleventh embodiment, and reducing signal loss and deterioration.

In the eleventh embodiment, the trunk for 3R 3D occupies a dedicated input/output port. However, in the twelfth embodiment, the trunks for 3R 3D-1 and 3D-2 are provided at output ports which connect to the transmission path, thereby avoiding any reduction in the number of output ports connecting to the transmission path and using the output ports more effectively.

Embodiment 13

The nodes according to the eleventh and twelfth embodiments can be realized by using an information processing device comprising a computer device. A program is installed in the computer device, allowing it to execute the following functions, corresponding to a device for controlling the nodes: a function corresponding to the optical-packet-for-test transmitting device 1D, which, prior to establishing the optical path, transmits an optical packet for test along the planned route of the optical path; a function corresponding to the signal quality decision sections 4D, which receives the optical packet for test and determines its signal quality; a function corresponding to the deterioration notifying section 5D, which notifies the router of the preceding stage when the signal quality decision section 4D has detected deterioration in the signal quality; and a function corresponding to the 3R control section 6D which receives the notification of the deterioration, and 3R processes subsequent optical packets transmitted along the path.

The program of the thirteenth embodiment can be installed in a computer device by storing it in a recording medium of this invention. Alternatively, the program of this embodiment can be installed directly in the computer device via a network from a server who holds the program.

Consequently, it is possible to realize a node and optical path network wherein the time and procedures required to set the position for 3R processing can be reduced, and the position can be precisely identified, thereby using the network resources effectively.

What is claimed is:

1. A node comprising:
a data transferring function for transferring data;
a data receiving function for receiving data; and
a unit for establishing and releasing a cut through path, through which an optical packet is transferred without a header of the optical packet being read, to a node of a next stage,
wherein the establishing and releasing unit comprises:
a unit which detects the arrival of a request packet for establishing a cut through path to the next stage while data transfer is being performed on a path for which the cut through path is to be established;
a unit which, when the unit which detects the arrival has detected the arrival of the request packet, establishes the cut through path to the node of the next stage;
a detecting unit which detects whether there has been a communication using the cut through path, established by the unit which establishes the cut through path; and
a releasing unit which releases the cut through path when no communication has been detected by the detecting unit for a predetermined period of time.

2. A node according to claim 1, wherein the establishing and releasing unit establishes a plurality of different wavelengths for transferring data to/from a node of the preceding stage and a node of the next stage.

3. A node according to claim 2, wherein the establishing and releasing unit establishes in advance one of the wavelengths for transferring data as a wavelength for control, to be used in establishing and releasing the cut through path.

4. A node according to claim 1, further comprising an optical path which a request to release a cut through path established by the establishing unit is transferred along; and
wherein the establishing and releasing unit comprises a unit for releasing the cut through path when a request to release the cut through path has arrived via the optical path.

5. An optical communication network comprising:
a transmission side edge node which accommodates a data transferring source;
a reception side edge node which accommodates a data transferring destination; and
a relay node which relays between the transmitting side edge node and the receiving side edge node; each node having the functions described in claim 1.

6. A node comprising:
a data transferring function for transferring data;
a data receiving function for receiving data; and
a unit for establishing and releasing a cut through path, through which an optical packet is transferred without a header of the optical packet being read, to a node of a next stage,
wherein the establishing and releasing unit detects the arrival of a request packet for establishing the cut through path to the next stage while data transfer is being performed on a path for which the cut through path is to be established, the establishing and releasing unit establishes a plurality of different wavelengths for transferring data to/from a node of the preceding stage and the node of the next stage,
the establishing and releasing unit establishes in advance one of the wavelengths for transferring data as a wavelength for control, to be used in establishing and releasing the cut through path, and
the establishing and releasing unit establishes in advance one of the wavelengths for transferring data other than the wavelength for control as a dedicated wavelength, to be used for the cut through path.

7. A node comprising:
a data transferring function for transferring data;
a data receiving function for receiving data; and
a unit for establishing and releasing a cut through path to a node of a next stage,
the establishing and releasing unit having a unit for detecting the arrival of a request packet for establishing a cut through path to the next stage while data transfer is being performed;
wherein the establishing and releasing unit establishes a plurality of different wavelengths for transferring data to/from a node of the preceding stage and a node of the next stage; and
wherein the establishing and releasing unit comprises:
a first monitoring unit which monitors the wavelengths for transferring data, into which have been inserted a preamble and control information, following the preamble, for requesting establishment, release, or path switching of the cut through path, and detects the preamble and the control information following the preamble at each of the wavelengths for transferring data;
an establishing unit which, when the first monitoring unit has determined that the control information following the preamble contains a request to establish the cut through path, establishes the cut through path in accordance with the request;
a second monitoring unit which, after the establishing unit has established the cut through path, monitors the preamble and the control information following the preamble in burst data transferred along the cut through path;
an executing unit which, when the second monitoring unit has determined that the control information following the preamble contains a request to switch the cut through path, executes path switching of the cut through path in accordance with the request; and
a releasing unit which, when the second monitoring unit has determined that the control information following the preamble contains a request to release the cut through path, releases the cut through path in accordance with the request.

8. A node comprising:
a data transferring function for transferring data;
a data receiving function for receiving data; and
a unit for establishing and releasing a cut through path to a node of a next stage,
the establishing and releasing unit having a unit for detecting the arrival of a request packet for establishing a cut through path to the next stage while data transfer is being performed;
wherein the establishing and releasing unit establishes a plurality of different wavelengths for transferring data to/from a node of the preceding stage and a node of the next stage; and wherein the establishing and releasing unit comprises:
a first monitoring unit which monitors the transferring of data for a predetermined period of time in a cycle t at each of the plurality of wavelengths for transferring data, and detects information for requesting an establishment of a cut through path, the information having been inserted at a timing in a cycle t when transferring the data;
an establishing unit which, when information requesting the establishment of a cut through path is extracted by the first monitoring unit, establishes the cut through path in accordance with the request;
a second monitoring unit which monitors burst data transferred along the cut through path for a predetermined period of time in each cycle t, in which information requesting continuation or release of the cut through path is inserted in each cycle t of the burst data transmitted along the cut through path, which was established by the establishing unit;
a continuation unit which, when information requesting continuation of the establishment of the cut through path has been extracted by the second monitoring unit, continues the establishment of the cut through path in accordance with the request; and
a release unit which, when information requesting release of the establishment of the cut through path has been extracted by the second monitoring unit, releases the establishment of the cut through path in accordance with the request.

9. A node according to claim 8, wherein the first and second monitoring units are provided for each of the wavelengths for transferring data, and for each of the cut through paths after they have been established.

10. A node having a data transferring function for transferring data; and a data receiving function for receiving data; and comprising:
a unit for establishing and releasing a cut through path to a node of a next stage, comprising a unit for detecting the arrival of a request packet for establishing the cut through path to the next stage, and establishes a plurality of different wavelengths for transferring data to/from a node of the preceding stage and the node of the next stage,
the establishing and releasing unit further comprising:
a first monitoring unit which monitors the transferring of data for a predetermined period of time in a cycle t at each of the plurality of wavelengths for transferring data, and detects information for requesting an establishment of a cut through path, the information having been inserted at a timing in a cycle t when transferring the data;
an establishing unit which, when information requesting the establishment of a cut through path is extracted by the first monitoring unit, establishes the cut through path in accordance with the information requesting the establishment;
a second monitoring unit which monitors burst data transferred along the cut through path for a predetermined period of time in each cycle t, in which information requesting continuation or release of the cut through path is inserted in each cycle t of the burst data transmitted along the cut through path, which was established by the establishing unit;
a continuation unit which, when information requesting continuation of the establishment of the cut through path has been extracted by the second monitoring unit, continues the establishment of the cut through path in accordance with the information requesting the continuation; and
a release unit which, when information requesting release of the establishment of the cut through path has been extracted by the second monitoring unit, releases the establishment of the cut through path in accordance with the information requesting the release,
the timings are set at mutually different phases in the plurality of wavelengths for transferring data,
the first monitoring unit including a unit being provided communally for the plurality of wavelengths for transferring data, and sequentially monitoring the information requesting establishment at the timings in a time-sharing arrangement,
the information requesting continuation and release of the cut through path being inserted at mutually different phases in the burst data transmitted along the plurality of cut through paths, and
the second monitoring unit including a unit being provided communally for the plurality of cut through paths, and sequentially monitoring the information requesting continuation and release at the timings in a time-sharing arrangement.

11. A node comprising:
a data transferring function for transferring data;
a data receiving function for receiving data; and
a unit for establishing and releasing a cut through path to a node of a next stage,
the establishing and releasing unit having a unit for detecting the arrival of a request packet for establishing a cut through path to the next stage while data transfer is being performed;
wherein the establishing and releasing unit comprising a unit which, when a detecting unit for detecting the arrival of a request packet for establishing a cut through path has detected the arrival of a request packet for establishing a cut through path to a node of the next stage, establishes the cut through path to the node of the next stage;
wherein an insertion timing for control information is set for the cut through path established by the establishing unit; and
the establishing and releasing unit comprises
a monitoring unit which monitors the insertion timing;
a follow-on continuation unit which continues the establishment of the cut through path when the monitoring unit has detected that the control information contains a request to continue the cut through path; and
a releasing unit which releases the cut through path when the monitoring unit has detected that the control information contains a request to release the cut through path.

12. A node comprising:
a data transferring function for transferring data;
a data receiving function for receiving data; and
a unit for establishing and releasing a cut through path to a node of a next stage,
the establishing and releasing unit having a unit for detecting the arrival of a request packet for establishing a cut through path to the next stage while data transfer is being performed;
wherein the establishing and releasing unit comprising a unit which, when a detecting unit for detecting the arrival of a request packet for establishing a cut through path has detected the arrival of a request packet for establishing a cut through path to a node of the next stage, establishes the cut through path to the node of the next stage; and wherein a preamble and control information following the preamble are inserted into the cut through path established by the establishing unit, and the establishing and releasing unit comprises a monitoring unit which monitors the preamble;

a detecting unit which detects the control information following the preamble when the preamble has been detected by the monitoring unit;

a releasing unit which releases the cut through path when the detecting unit has detected that the control information contains a request to release the cut through path.

13. A node comprising:

a data transferring function for transferring data;

a data receiving function for receiving data; and a unit for establishing and releasing a cut through path to a node of a next stage, the establishing and releasing unit having a unit for detecting the arrival of a request packet for establishing a cut through path to the next stage while data transfer is being performed;

wherein the establishing and releasing unit comprising a unit which, when a detecting unit for detecting the arrival of a request packet for establishing a cut through path has detected the arrival of a request packet for establishing a cut through path to a node of the next stage, establishes the cut through path to the node of the next stage; and wherein a preamble is inserted into the cut through path established by the establishing unit; and the establishing and releasing unit comprises a monitoring unit which monitors the preamble; and a releasing unit which releases the cut through path when the preamble has been detected by the monitoring unit.

14. A computer program for executing the functions of transferring data, receiving data, establishing and releasing a cut through, through which an optical packet is transferred without a header of the optical packet being read, to a node of a next stage, and enabling the function for establishing and releasing the cut through path to detect the arrival of a request packet for establishing a cut through path to the next stage while data transfer is being performed on a path for which the cut-through path is to be established; to, when the arrival of the request packet has been detected, establish the cut through path to the node of the next stage; to detect whether there has been a communication using the cut through path, which has been established; and to release the cut through path when no communication has been detected for a predetermined period of time.

15. A recording medium which the program according to claim 14 is stored in, the recording medium being readable by a data-processing device.

* * * * *